US012744315B2

(12) United States Patent
Yoshida et al.

(10) Patent No.: US 12,744,315 B2
(45) Date of Patent: Sep. 22, 2026

(54) PLANAR ANTENNA AND ANTENNA DEVICE

(71) Applicant: NEC Corporation, Tokyo (JP)

(72) Inventors: Kohei Yoshida, Tokyo (JP); Fujio Okumura, Kanagawa (JP)

(73) Assignee: NEC CORPORATION, Tokyo (JP)

(*) Notice: Subject to any disclaimer, the term of this patent is extended or adjusted under 35 U.S.C. 154(b) by 79 days.

(21) Appl. No.: 18/818,739

(22) Filed: Aug. 29, 2024

(65) Prior Publication Data

US 2025/0096461 A1 Mar. 20, 2025

(30) Foreign Application Priority Data

Sep. 19, 2023 (JP) ................................ 2023-150693

(51) Int. Cl.
*H01Q 9/04* (2006.01)
*H01Q 3/40* (2006.01)

(52) U.S. Cl.
CPC ............ *H01Q 3/40* (2013.01); *H01Q 9/0457* (2013.01)

(58) Field of Classification Search
CPC ...... H01Q 3/40; H01Q 9/0407; H01Q 9/0457; H01Q 21/065
See application file for complete search history.

(56) References Cited

U.S. PATENT DOCUMENTS 6,556,168 B1 * 4/2003 Marumoto ............ H01Q 23/00 342/372
2020/0168746 A1 * 5/2020 Otsubo ............. H10D 30/6733

FOREIGN PATENT DOCUMENTS

JP H11-074717 A 3/1999

* cited by examiner

*Primary Examiner* — Daniel Munoz

(57) ABSTRACT

Provided is a planar antenna including an antenna array in which a plurality of patch antennas are disposed in a two-dimensional array; a substrate on which a phase shifter layer including a phase shifter associated with each of the plurality of patch antennas and wiring used for controlling the phase shifter is formed; a signal line through which a communication signal propagates; and a ground layer disposed between the phase shifter layer and the signal line, and having a slot formed at least between the signal line and the phase shifter.

10 Claims, 18 Drawing Sheets

PLANAR ANTENNA AND ANTENNA DEVICE

This application is based upon and claims the benefit of priority from Japanese Patent Application No. 2023-150693, filed on Sep. 19, 2023, the disclosure of which is incorporated herein in its entirety by reference.

TECHNICAL FIELD

The present disclosure relates to a planar antenna and an antenna device.

BACKGROUND ART

PTL 1 (JP 11-074717 A) discloses a phased array antenna device having a plurality of radiating elements. The device of PTL 1 has a multilayer structure including a plurality of radiating elements, a plurality of phase shifters, a phase shift control circuit, and a power supply unit. The phase shifter is coupled to any of the radiating elements and shifts the phase of the power supply signal supplied to the radiating element bit by bit. The phase shift control circuit controls phase shifts of the plurality of phase shifters. The power supply unit is coupled with the radiating element.

According to the configuration of PTL 1, the antenna gain can be improved by increasing the number of elements. However, when the number of elements is increased to a scale of 10,000, there is a possibility that a wiring line used for selecting a phase shifter or writing data and a signal line intersect with each other and interfere with each other. When a wiring line used for selecting a phase shifter or writing data and a signal line interfere with each other, the characteristic impedance of the signal line may fluctuate.

An object of the present disclosure is to provide a planar antenna and an antenna device in which fluctuations in characteristic impedance in a signal line is suppressed.

SUMMARY

A planar antenna according to an aspect of the present disclosure includes an antenna array in which a plurality of patch antennas are disposed in a two-dimensional array, a substrate on which a phase shifter layer including a phase shifter associated with each of the plurality of patch antennas and wiring used for controlling the phase shifter is formed, a signal line through which a communication signal propagates, and a ground layer disposed between the phase shifter layer and the signal line, and having a slot formed at least between the signal line and the phase shifter.

BRIEF DESCRIPTION OF THE DRAWINGS

Exemplary features and advantages of the present disclosure will become apparent from the following detailed description when taken with the accompanying drawings in which.

EXAMPLE EMBODIMENT

Figure 1:
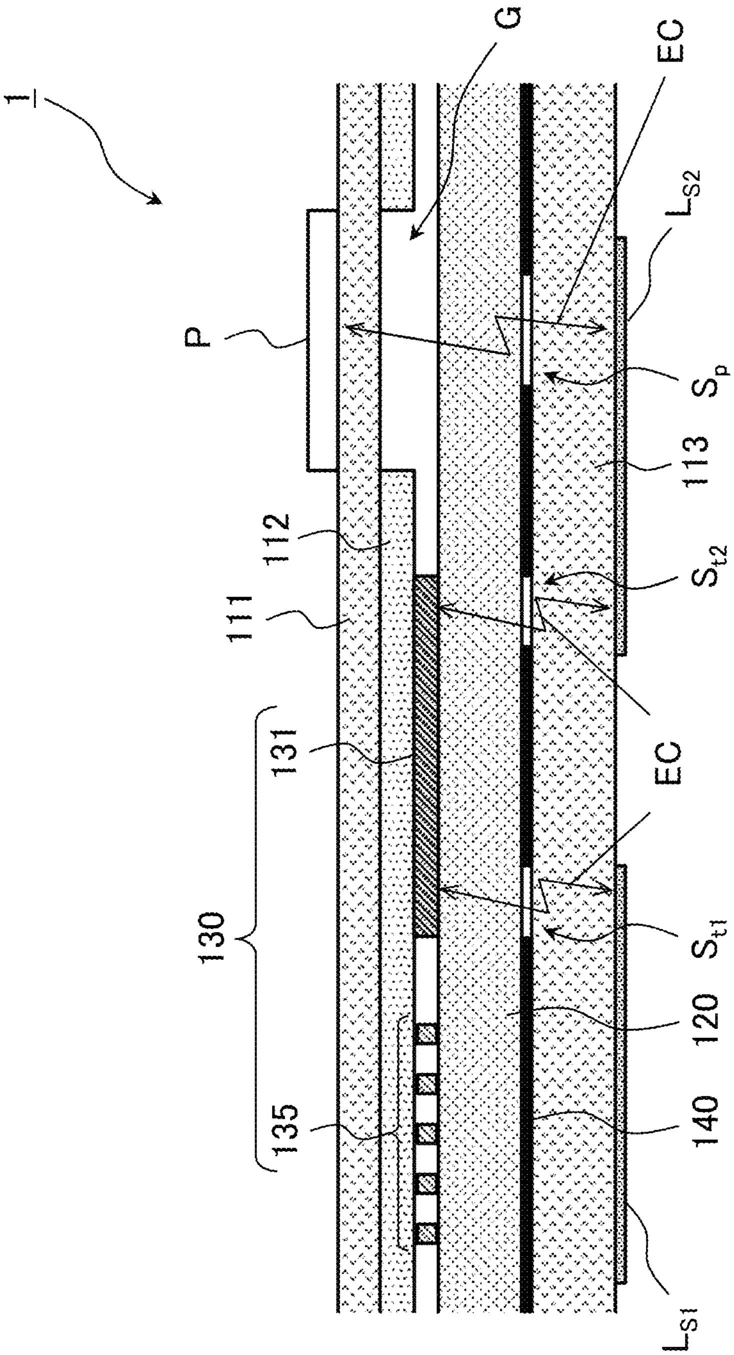
FIG. 1 is a conceptual diagram illustrating an example of a configuration of a planar antenna according to the present disclosure.

Example embodiments of the present disclosure will be described below with reference to the drawings. In the following example embodiments, technically preferable limitations are imposed to carry out the present disclosure, but the scope of this disclosure is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment

First, a planar antenna according to a first example embodiment will be described with reference to the drawings. The planar antenna of the present example embodiment includes a patch antenna that is a type of planar antenna. Hereinafter, description of a transmission device that transmits a radio wave from the planar antenna and a reception device that receives a radio wave received by the planar antenna will be omitted. For example, the planar antenna of the present example embodiment is used for transmission and reception of electromagnetic waves in a high frequency band expected to be applied to mobile communication of a Beyond 5 Generation (B5G) subsequent to a 5 Generation (5G). For example, the planar antenna of the present example embodiment is used for transmission and reception of signals of millimeter waves or terahertz waves. The planar antenna of the present example embodiment may be used for transmission and reception of signals other than millimeter waves and terahertz waves.

For example, the planar antenna of the present example embodiment includes a phase shift element formed using a micro light-emitting diode (LED) display manufacturing processing technology. The planar antenna of the present example embodiment includes a switching element formed using a thin film transistor (TFT) manufacturing processing technology. In the production of the planar antenna of the present example embodiment, a micro LED display manufacturing processing technology (micro LED processing technology) and a thin film transistor manufacturing processing technology (TFT processing technology) are combined. The planar antenna of the present example embodiment may be manufactured using a technology other than the micro LED processing technology and the TFT processing technology.

Configuration

FIG. 1 is a cross-sectional view illustrating a cross section of part of a planar antenna in the present disclosure. A planar antenna 1 of the present example embodiment includes a patch antenna P, a first insulating layer 111, a second insulating layer 112, a third insulating layer 113, a TFT substrate 120, a phase shifter layer 130, and a ground layer 140. A phase shifter 131 and a TFT wiring 135 are formed in the phase shifter layer 130. The TFT wiring 135 includes wiring such as selection lines and data lines used for controlling the phase shifter. The planar antenna 1 includes signal lines (signal line $L_{S1}$, signal line $L_{S2}$) connected to a signal source (not illustrated). The signal line $L_{S1}$ (first signal line) is a signal line that is connected to a signal source and through which a signal before phase shift is propagated. A signal line $L_{S2}$ (second signal line) is a signal line through which the phase-shifted signal phase-shifted by the phase shifter 131 is propagated to the patch antenna P.

The first insulating layer 111 is formed on the surface of the planar antenna 1. A patch antenna array are disposed on the upper face of the first insulating layer 111. The patch antenna array includes a plurality of patch antennas P. Although a single patch antenna P is illustrated in FIG. 1, the planar antenna 1 includes a plurality of patch antennas P. The plurality of patch antennas P are disposed in a lattice shape along two directions orthogonal to each other. The plurality of patch antennas P is phased arrayed. The patch antenna P is a plate-shaped radiating element. For example, the patch antenna P has a square shape. The shape of the patch antenna P is not limited to a square shape, and may be a circular shape or other shapes.

The first insulating layer 111 is stacked on the upper face of the second insulating layer 112. For example, the material of the first insulating layer 111 is glass, or resin such as glass epoxy, tetrafluoroethylene or epoxy. The first insulating layer 111 may be made of a material other than glass, or resin such as glass epoxy, tetrafluoroethylene or epoxy, as long as it can transmit and receive communication radio waves. The first insulating layer 111 and the second insulating layer 112 may be integrated.

The second insulating layer 112 is formed under the first insulating layer 111. TFT substrate 120 is disposed below the second insulating layer 112. The upper face of the second insulating layer 112 is in contact with the lower face of the first insulating layer 111. The lower face of second insulating layer 112 is in contact with the TFT wiring 135 formed on the upper face of the TFT substrate 120 and the phase shifter layer 130. The second insulating layer 112 has an opening below the patch antenna P. The opening formed in the second insulating layer 112 is referred to as an air gap G. The TFT wiring 135 and the phase shifter layer 130 are disposed at positions avoiding below the air gap G. The air gap G is formed for the purpose of lowering the dielectric constant between the signal line $L_{S2}$ and the patch antenna P. In a case where the air gap G is unnecessary, the second insulating layer 112 may be omitted. For example, the material of the second insulating layer 112 is glass, glass epoxy, or resin such as tetrafluoroethylene or epoxy. The second insulating layer 112 may be made of a material other than glass, or resin such as glass epoxy, tetrafluoroethylene or epoxy, as long as it can transmit and receive communication radio waves.

TFT substrate 120 is disposed below the second insulating layer 112. For example, a material of the TFT substrate 120 is a dielectric such as glass. TFT wiring 135 and the phase shifter layer 130 are formed on an upper face of the TFT substrate 120. TFT wiring 135 includes a plurality of selection lines used to select phase shifter 131 and a plurality of data lines used to write phase shift data to the phase shifter 131. A matrix circuit is formed on the upper face of the TFT substrate 120. The matrix circuit has a structure in which a plurality of thin film transistors (TFT) is disposed in a two-dimensional array. For example, the TFT included in the matrix circuit is formed using a TFT processing technology. A signal layer is formed above the matrix circuit. In the signal layer, wiring constituting the phase shift element, a switch group including a plurality of switching elements, and wiring for connecting wiring constituting the phase shift element and the switch group are formed. For example, the switching elements are formed using the micro-LED processing technology. For example, a material of the TFT substrate 120 is glass, or resin such as glass epoxy, tetrafluoroethylene or epoxy. The TFT substrate 120 may be made of a material other than glass, or resin such as glass epoxy, tetrafluoroethylene or epoxy, as long as it can transmit and receive communication radio waves.

On the lower face of the TFT substrate 120, the ground layer 140 (ground layer) is disposed. The ground layer 140 blocks electromagnetic coupling between the upper and lower sides of the ground layer 140. The ground layer 140 is made of an electric conductor. For example, a material of the ground layer 140 is metal (including alloy) such as copper, aluminum, and chromium. The potential of the ground layer 140 is a ground potential. Therefore, a capacitance related to the dielectric constant of the TFT substrate 120 is formed between the phase shifter layer 130 and the ground layer 140. The lower face of the ground layer 140 is in contact with the upper face of the third insulating layer 113.

The ground layer 140 has a plurality of openings. The opening formed in the ground layer 140 is referred to as a slot. The slot includes a phase shifter slot $S_t$ and a patch slot $S_p$. The phase shifter slot $S_t$ is formed between the phase shifter layer 130 and the signal line. In the example of FIG. 1, two phase shifter slots $S_t$ (Phase shifter slot $S_{t1}$, phase shifter slot $S_{t2}$) are formed in the ground layer 140. The phase shifter slot $S_{t1}$ is formed below the first end of the phase shifter 131 formed in the phase shifter layer 130. The phase shifter slot $S_{t2}$ is formed below the second end of the phase shifter 131 formed in the phase shifter layer 130. The patch slot $S_p$ is formed between the patch antenna P and the signal line.

The signal supplied from the signal source is propagated from a signal line $L_{S1}$ to the first end of the phase shifter 131 by electromagnetic coupling via the phase shifter slot $S_{t1}$. The signal propagated to the phase shifter 131 is phase-shifted according to the length between the first end and the second end of the phase shifter 131. The signal phase-shifted by the phase shifter is propagated from the second end of the phase shifter 131 to the signal line $L_{S2}$ by electromagnetic coupling via the phase shifter slot $S_{t2}$. The signal phase-shifted by the phase shifter 131 propagates through the signal line $L_{S2}$ and reaches below the patch antenna P. The signal reaching below the patch antenna P is propagated from the signal line $L_{S2}$ to the patch antenna P by electromagnetic coupling via the patch slot $S_p$. The signal propagated to the patch antenna P is transmitted as a radio signal from the phased array antenna configured by the plurality of patch antennas P.

The third insulating layer 113 is disposed below ground layer 140. The upper face of the third insulating layer 113 is in contact with the lower face of the ground layer 140. The signal line $L_{S1}$ and the signal line $L_{S2}$ are disposed on the lower face of the third insulating layer 113. The signal line $L_{S1}$ and the signal line $L_{S2}$ are wiring used to give a phase level to the phase shifter 131 formed in the phase shifter layer 130. For example, the material of the third insulating layer 113 is glass, or resin such as glass epoxy, tetrafluoroethylene or epoxy. The third insulating layer 113 may be made of a material other than glass, or resin such as glass epoxy, tetrafluoroethylene or epoxy, as long as it can transmit and receive communication radio waves.

The phase shifter 131 formed in the phase shifter layer 130 is disposed above one end of the signal line $L_{S1}$. The one end of the signal line $L_{S1}$ functions as an open end of the microstrip line. The signal line $L_{S1}$ is connected to the upper phase shifter 131 by electromagnetic coupling electromagnetic coupling (EC) via the phase shifter slot $S_{t1}$ of the ground layer 140. The capacitance related to the dielectric constant of the TFT substrate 120 and the third insulating layer 113 is formed between the signal line $L_{S1}$ and the phase shifter 131.

Part of the signal line $L_{S2}$ passes beneath the patch antenna P. The signal line $L_{S2}$ is connected to the upper patch antenna P by the electromagnetic coupling EC via the patch slot $S_p$ and the air gap G. A capacitance related to the dielectric constant of the TFT substrate 120 and the third insulating layer 113 is formed between the signal line $L_{S2}$ and the patch antenna P.

The patch antenna P is fed by an electromagnetic coupling power supply system. The patch antenna P is electromagnetically coupled to the signal line $L_{S2}$ formed on the lower face of the third insulating layer 113 via the patch slot $S_p$ and the air gap G. The patch antenna P is excited by electromagnetically coupling the patch antenna P with the signal line $L_{S2}$ via the patch slot $S_p$ and the air gap G. The impedance can be matched by disposing the open end of the signal line $L_{S2}$ at a position away from immediately below the slot S by about ¼ wavelength and adjusting the dimension of the patch slot $S_p$. For example, the patch slot $S_p$ has a rectangular shape. For example, the shape of the patch slot $S_p$ may be a shape other than a rectangle, such as a dog-bone shape.

The patch antenna P has a structure equivalent to that of a microstrip line whose both ends are opened. The resonance frequency of the patch antenna P is an integral multiple of ½ of a wavelength corresponding to the length of one side of the patch antenna P. The size of the patch antenna P is set according to the wavelength of the radio wave to be transmitted. Since the patch antenna P is an open type resonator that resonates at a resonance frequency, the Q factor decreases due to radio wave radiation. In order to avoid a decrease in the Q factor due to radio wave radiation and operate the patch antenna P as a resonator, it is preferable that the dielectric constants of the materials of the third insulating layer 113 and the TFT substrate 120 are as high as possible. As the dielectric constants of the materials of third insulating layer 113 and TFT substrate 120 are higher, transmission of radio waves can be further suppressed. In a case where the material of the third insulating layer 113 and the TFT substrate 120 is a high dielectric, the thicknesses of the third insulating layer 113 and the TFT substrate 120 and the width of the patch antenna P are set to be sufficiently smaller than the wavelength of the radio wave used for communication. For example, in a case where the material of the third insulating layer 113 and the TFT substrate 120 is a low dielectric, a microstrip antenna can be configured by increasing the thickness of the third insulating layer 113 and the width of the patch antenna P with respect to the wavelength of the radio wave to be transmitted to increase the radiation amount.

The patch antenna P is preferably configured in such a way that a signal (radio wave) is easily radiated into space. On the other hand, it is preferable that an internal wiring such as a signal line or a wiring is less likely to emit a signal. That is, the smaller the dielectric constant required around the patch antenna P, the better, and the larger the dielectric constant required around the internal wiring, the better. Therefore, it is preferable that different manufacturing processes are applied to the structure around the patch antenna P and the structure around the internal wiring. For example, by applying a method in which a structure around the patch antenna P is formed by a liquid crystal process and a structure around the internal wiring is formed by a thin film process, the structure of the planar antenna 1 of the present example embodiment can be achieved.

Figure 2:
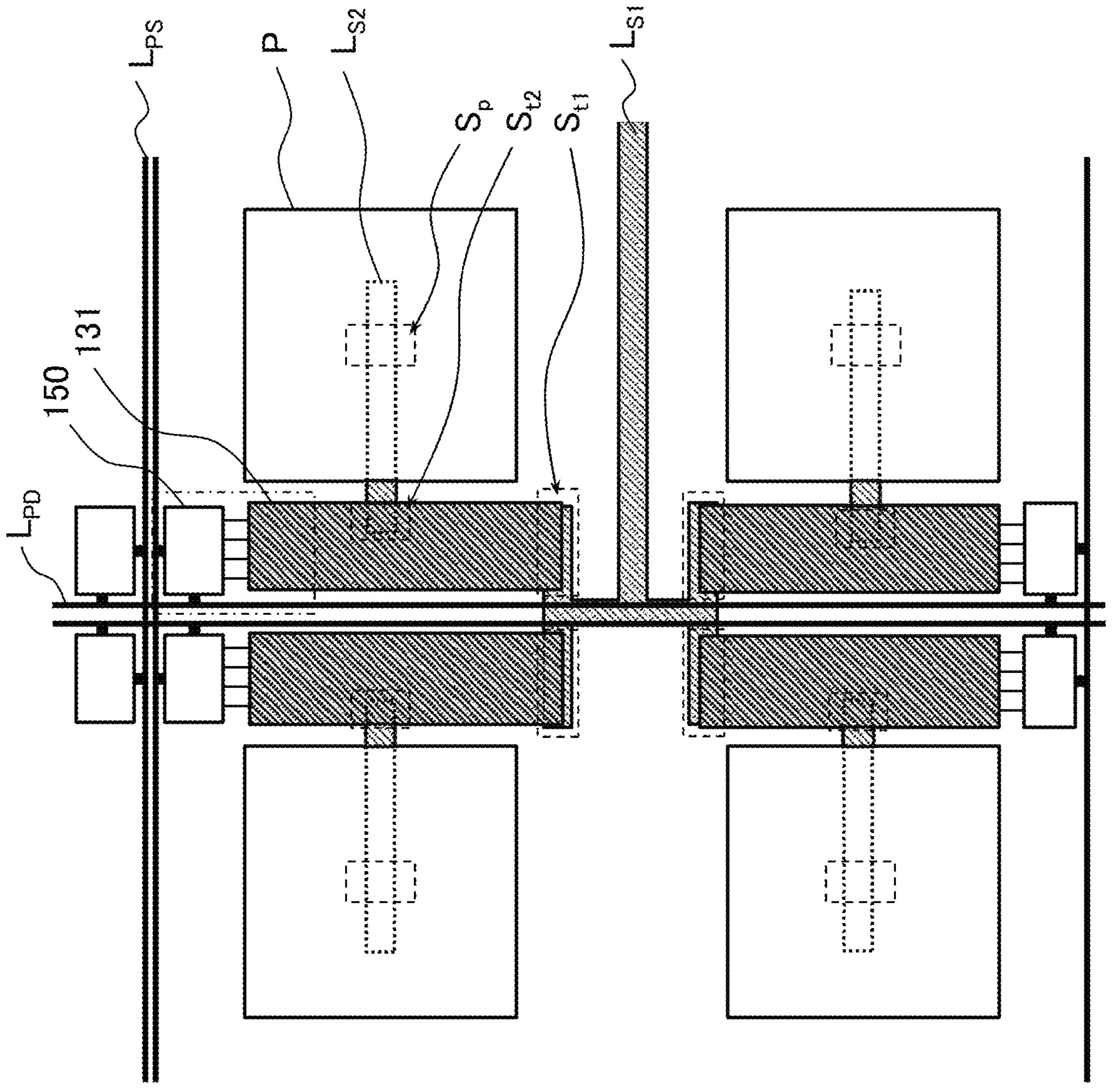
FIG. 2 is a conceptual diagram illustrating an example of a configuration of a planar antenna according to the present disclosure.

FIG. 2 is a plan view of part of the planar antenna in the present disclosure. In FIG. 2, the first insulating layer 111, the second insulating layer 112, the third insulating layer 113, the TFT substrate 120, and the ground layer 140 are omitted. FIG. 2 illustrates a positional relationship between the patch antenna P, the phase shifter 131 formed in the phase shifter layer 130, and the signal line $L_S$. FIG. 2 illustrates a selection line $L_{PS}$, a data line $L_{PD}$, and a phase shifter memory 150.

As illustrated in FIG. 2, the signal line $L_{S1}$ and the signal line $L_{S2}$ are disposed at positions avoiding below the selection line $L_{PS}$ and the data line $L_{PD}$. Part of the signal line $L_{S2}$ passes beneath the patch antenna P via the patch slot $S_p$. The signal line $L_{S2}$ is electromagnetically coupled to the patch antenna P via the patch slot $S_p$. Part of the signal line $L_{S1}$ passes beneath the phase shifter 131 via the phase shifter slot $S_{t1}$ and the phase shifter slot $S_{t2}$. The signal line $L_{S1}$ is electromagnetically coupled to the phase shifter 131 via the phase shifter slot $S_{t1}$ and the phase shifter slot $S_{t2}$.

Figure 3:
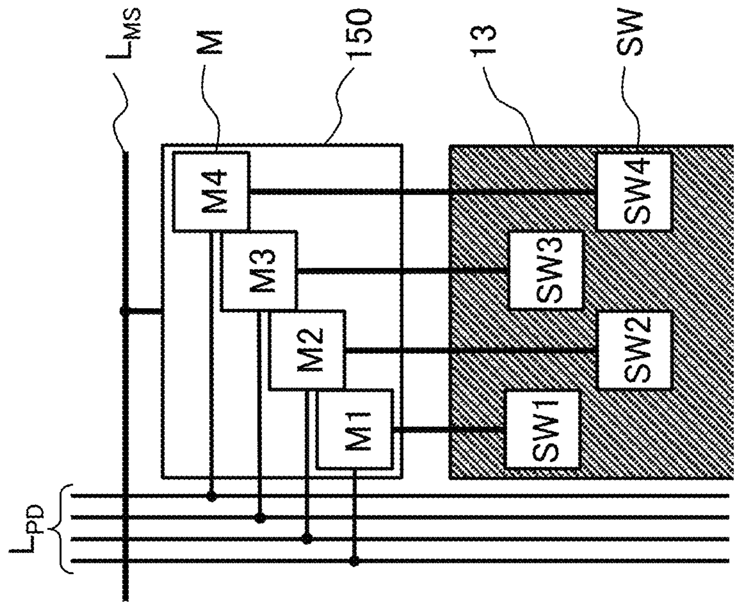
FIG. 3 is a conceptual diagram for describing an example of a phase shifter memory included in a planar antenna in the present disclosure.

FIG. 3 is a conceptual diagram for describing the phase shifter memory 150. The phase shifter memory 150 includes a number of memories M related to the number of bits. In the example of FIG. 3, phase shifter memory 150 has 4 bits. The phase shifter memory 150 includes four memories M (M1, M2, M3, M4). FIG. 3 illustrates a memory selection line $L_{MS}$ for making the memory M included in the phase shifter memory 150 writable. A data line $L_{PD}$ for writing data to the memory M is illustrated. In the example of FIG. 3, four data lines $L_{PD}$ disposed in association with each of the plurality of memories M is illustrated.

In the phase shifter 131, a plurality of switch groups SW (SW1, SW2, SW3, SW4) associated with the plurality of memories M is disposed. For example, in a case where the phase shifter 131 is a 4-bit line switching type, the switch group SW includes 4 switches (16 switches in total) per bit. The switch group SW1 is connected to the memory M1. The switch group SW2 is connected to the memory M2. The switch group SW3 is connected to the memory M3. The switch group SW4 is connected to the memory M4. For example, the switch group SW includes a switching element including a thin film of vanadium dioxide $VO_2$.

Figure 4:
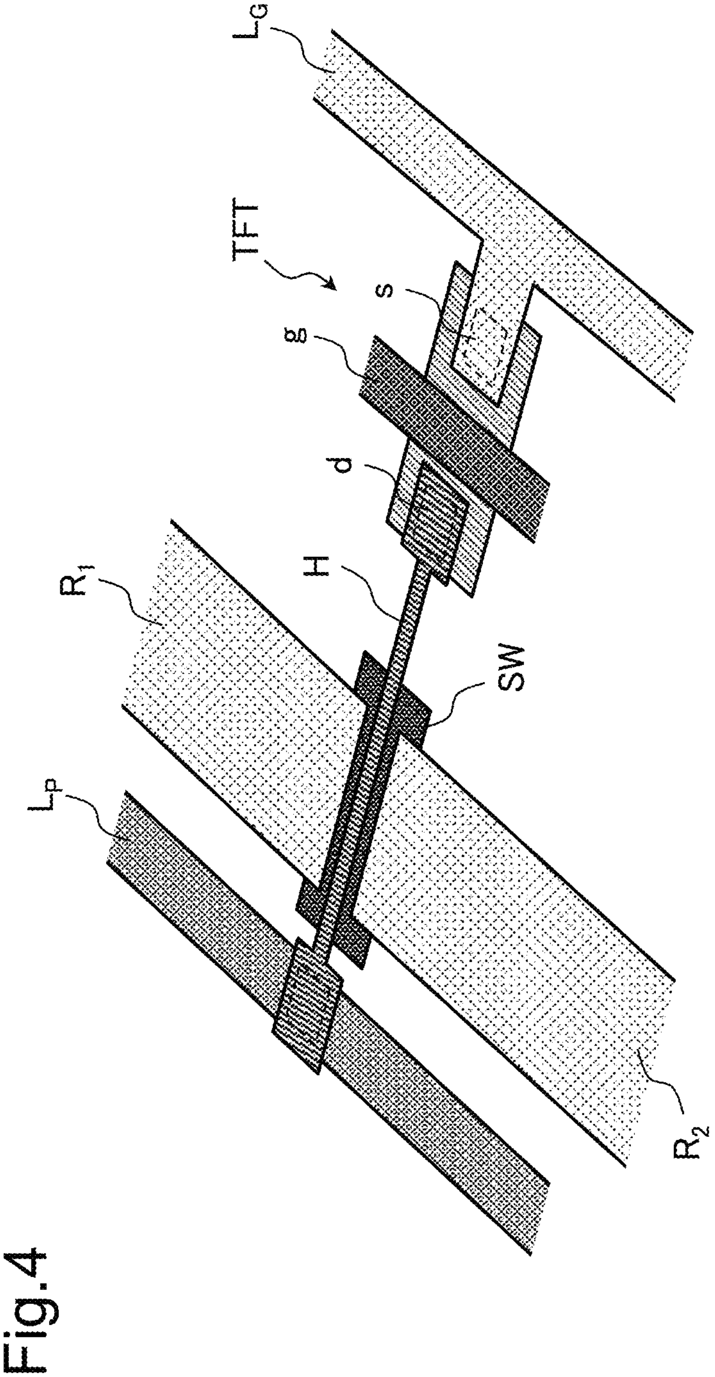
FIG. 4 is a conceptual diagram for describing an example of a switch included in a planar antenna in the present disclosure.

FIG. 4 is a conceptual diagram for describing a configuration of the switch group SW including a switching element including a thin film of vanadium dioxide $VO_2$. FIG. 4 illustrates an example in which a transmission line $R_1$ and a transmission line $R_2$ are electrically connected via the switch group SW. A heating line His thermally connected to the switch group SW. The first end of heating line H is connected to a power supply line $L_P$. The second end of the power supply line $L_P$ is connected to a drain d of the TFT. The source of the TFT is connected to a ground line $L_G$. When a gate voltage is applied to a gate g of the TFT, a current is supplied from the power supply line $L_P$ between the drain d and a source s of the TFT. The current from the power supply line $L_P$ is supplied to the TFT via the heating line H. When the current flows through the heating line H, the heating line H generates heat. When the temperature of the switch group SW in contact with the heating line H exceeds the phase transition temperature of the vanadium dioxide $VO_2$, the switch group SW transitions to the ON state. When the switch group SW transitions to the ON state, the transmission line $R_1$ and the transmission line $R_2$ are electrically connected. In the present example embodiment, the transmission line $R_1$ is connected to the memory M, and the transmission line $R_2$ is connected to the phase shifter 131.

Figure 5:
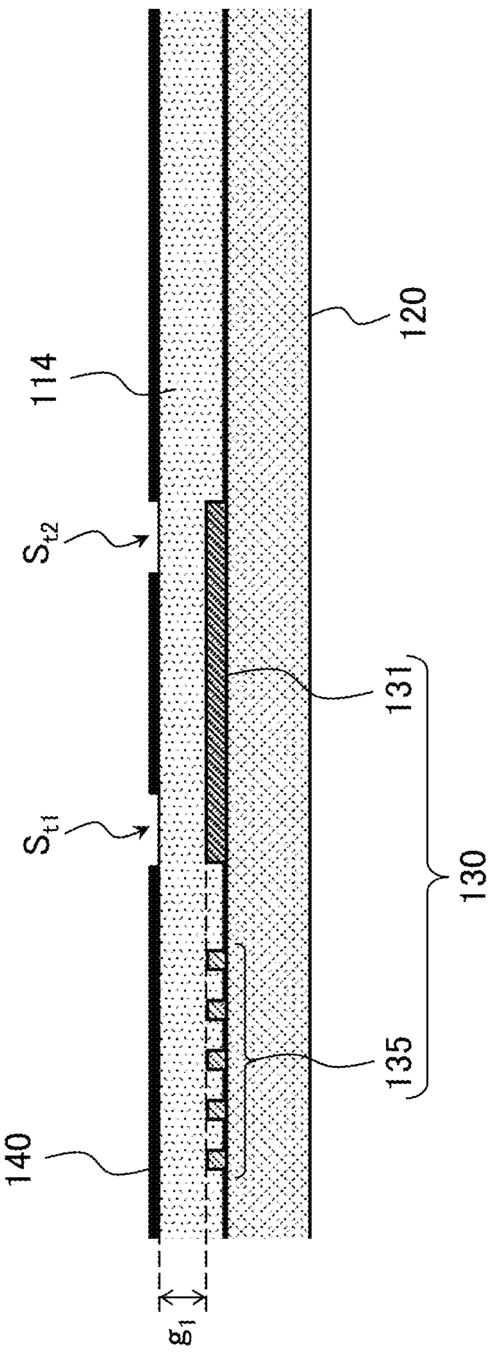
FIG. 5 is a conceptual diagram for describing an example of a structure of a phase shifter included in a planar antenna in the present disclosure.
Figure 6:
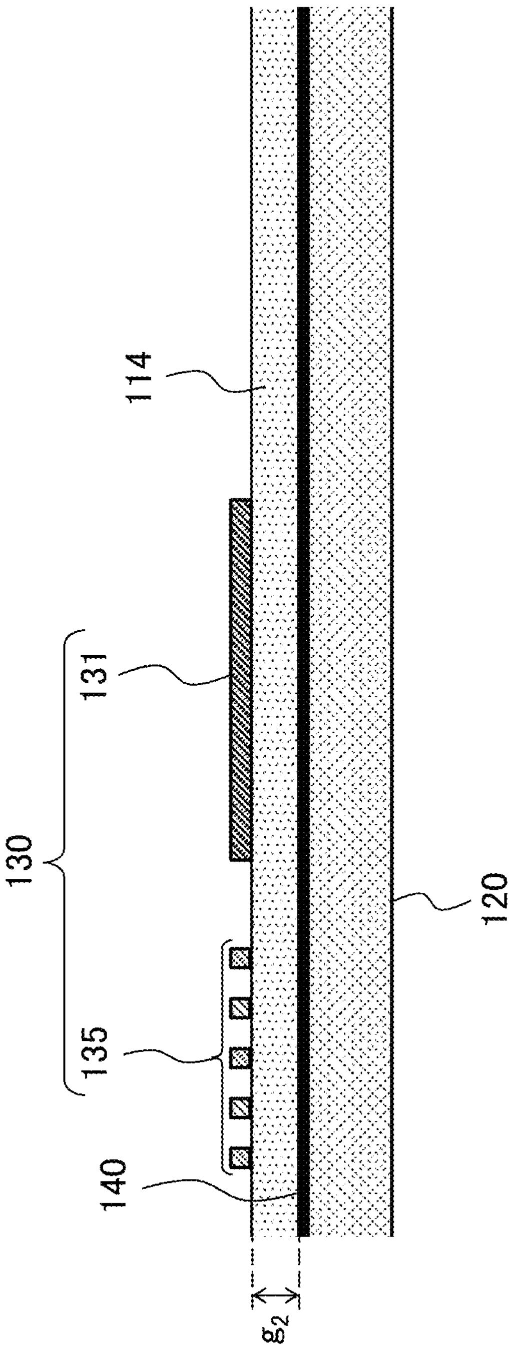
FIG. 6 is a conceptual diagram for describing an example of a structure of a phase shifter included in a planar antenna in the present disclosure.
Figure 7:
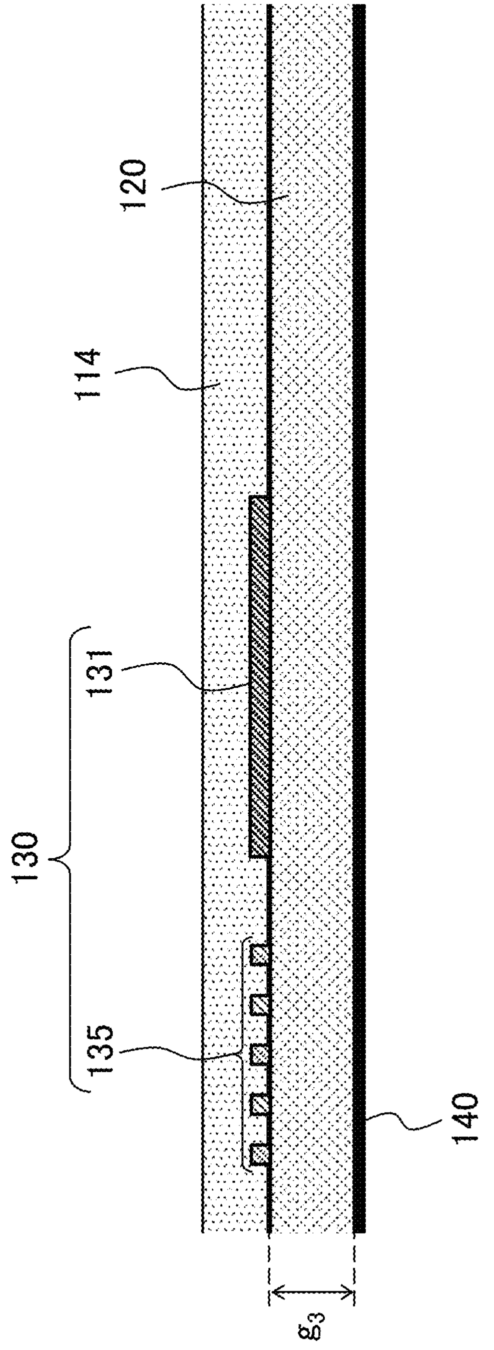
FIG. 7 is a conceptual diagram for describing an example of a structure of a phase shifter included in a planar antenna in the present disclosure.

FIGS. 5 to 7 are conceptual diagrams for describing variations of the phase shifter 131 formed in the phase shifter layer 130. FIGS. 5 to 7 are examples of variations of the phase shifter 131. However, FIGS. 5 to 7 do not limit variations of the phase shifter.

FIG. 5 illustrates an example of a structure in which the stripline of the phase shifter 131 and the ground layer 140 are separated by an insulating layer (dielectric layer 114) formed using the TFT process. In the structure of FIG. 5, the characteristic impedance is secured by a gap $g_1$ between the lower face of the ground layer 140 and the upper face of the phase shifter 131.

FIG. 6 illustrates another example of a structure in which the stripline of the phase shifter 131 and the ground layer 140 are separated by an insulating layer (dielectric layer 114) formed using the TFT process. The structure of FIG. 6 is a structure in which the upper and lower faces of the structure stacked on the TFT substrate 120 in FIG. 5 are turned upside down. In the structure of FIG. 6, the characteristic impedance is secured by a gap $g_2$ between the lower face of the phase shifter 131 and the upper face of the ground layer 140. That is, in the example of FIG. 6, the characteristic impedance is secured by the film thickness of the dielectric layer 114.

FIG. 7 illustrates an example in which the insulating layer (dielectric layer 114) is formed on the upper face of the TFT substrate 120 using the TFT process. The ground layer 140 is formed on a lower face of the TFT substrate 120. In the structure of FIG. 7, the characteristic impedance is secured by a gap $g_3$ between the lower face of the phase shifter 131 and the upper face of the ground layer 140. That is, in the example of FIG. 7, the characteristic impedance is secured by the thickness of the TFT substrate 120.

The phase shifter 131 is formed by the TFT process. For example, as in the examples of FIGS. 3 to 4, the phase shifter 131 is provided with a switch group SW of the vanadium dioxide $VO_2$. For example, a signal line that gives a phase level to a plurality of phase shifters 131 disposed in a matrix and the memory M that stores data for each phase shifter 131 are formed as a TFT circuit. Therefore, in the planar antenna 1, internal wiring such as signal lines and selection lines are disposed in a matrix. Portions where these internal wiring intersect are separated with the ground layer 140 interposed between the separated portions. Therefore, in the planar antenna 1 of the present example embodiment, the dielectric constant around the patch antenna P and the dielectric constant around the internal wiring can be set to completely different values. That is, according to the present example embodiment, the dielectric constant around the patch antenna P and the dielectric constant around the internal wiring can be set to values according to respective requirements.

MODIFICATIONS

Next, the modifications of the planar antenna 1 of the present example embodiment will be described with reference to the drawings. In the following description, description of the matters described so far may be omitted. The following modification is an example, and does not limit the configuration of the planar antenna 1 of the present example embodiment.

First Modification

Figure 8:
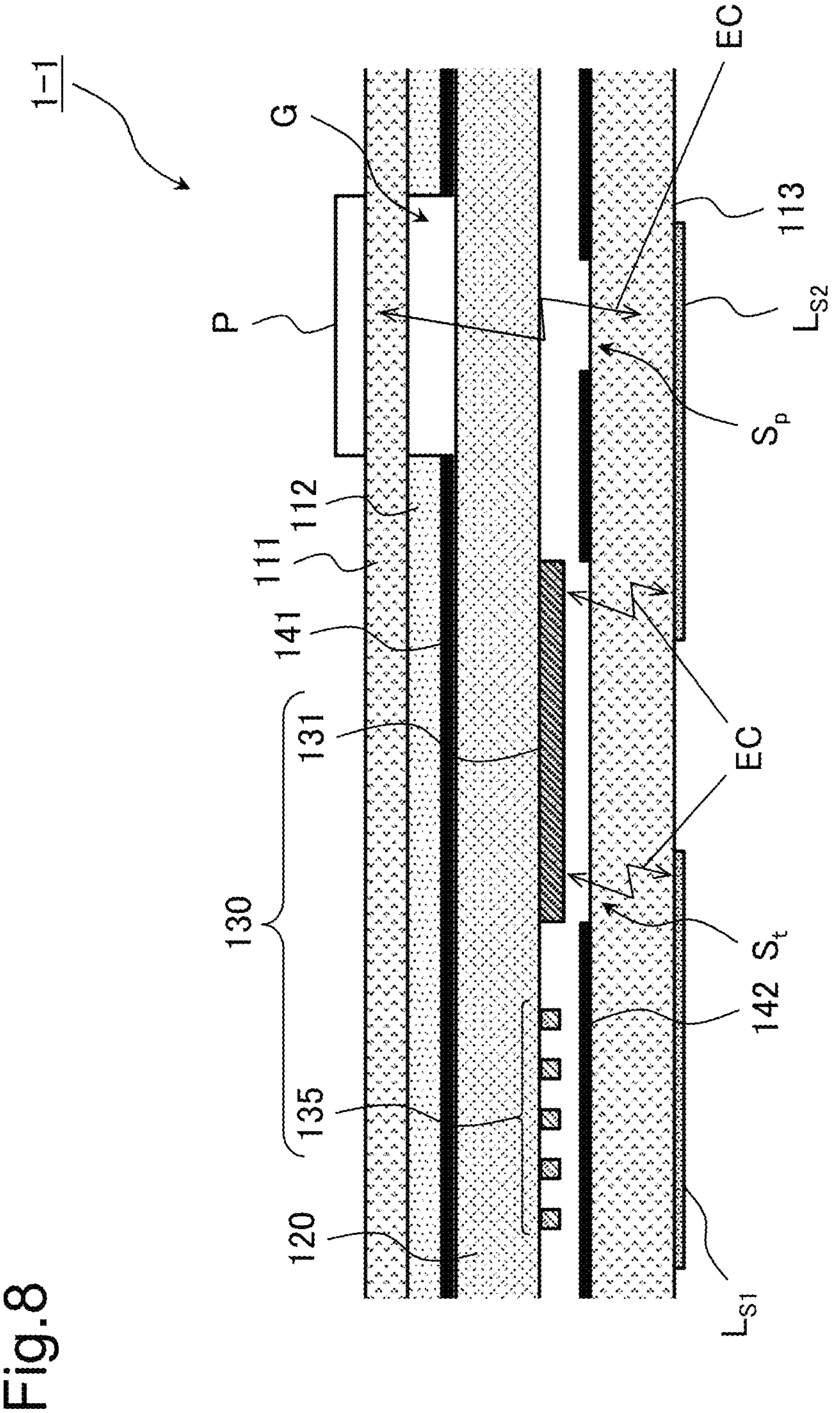
FIG. 8 is a conceptual diagram illustrating an example of a configuration of a planar antenna according to the present disclosure.

FIG. 8 is a cross-sectional view illustrating a cross section of part of a planar antenna in the present disclosure. A planar antenna 1-1 of the first modification has a configuration in which the upper and lower faces of the TFT substrate 120 are turned upside down in the planar antenna 1 (FIG. 1). A ground layer 141 (first ground layer) is formed on an upper face of the TFT substrate 120. The TFT wiring 135 and the phase shifter layer 130 are formed on a lower face of the TFT substrate 120. The phase shifter slot $S_t$ and the patch slot $S_p$ are opened in a ground layer 142 (second ground layer).

In the planar antenna 1-1, the signal line $L_{S1}$ and the phase shifter 131 formed in the phase shifter layer 130 are connected by the electromagnetic coupling EC. In the planar antenna 1-1, the signal line $L_{S1}$ and the patch antenna P are connected by the electromagnetic coupling EC. The characteristic impedance of the portion of the phase shifter 131 is secured with the ground layer 141.

Second Modification

Figure 9:
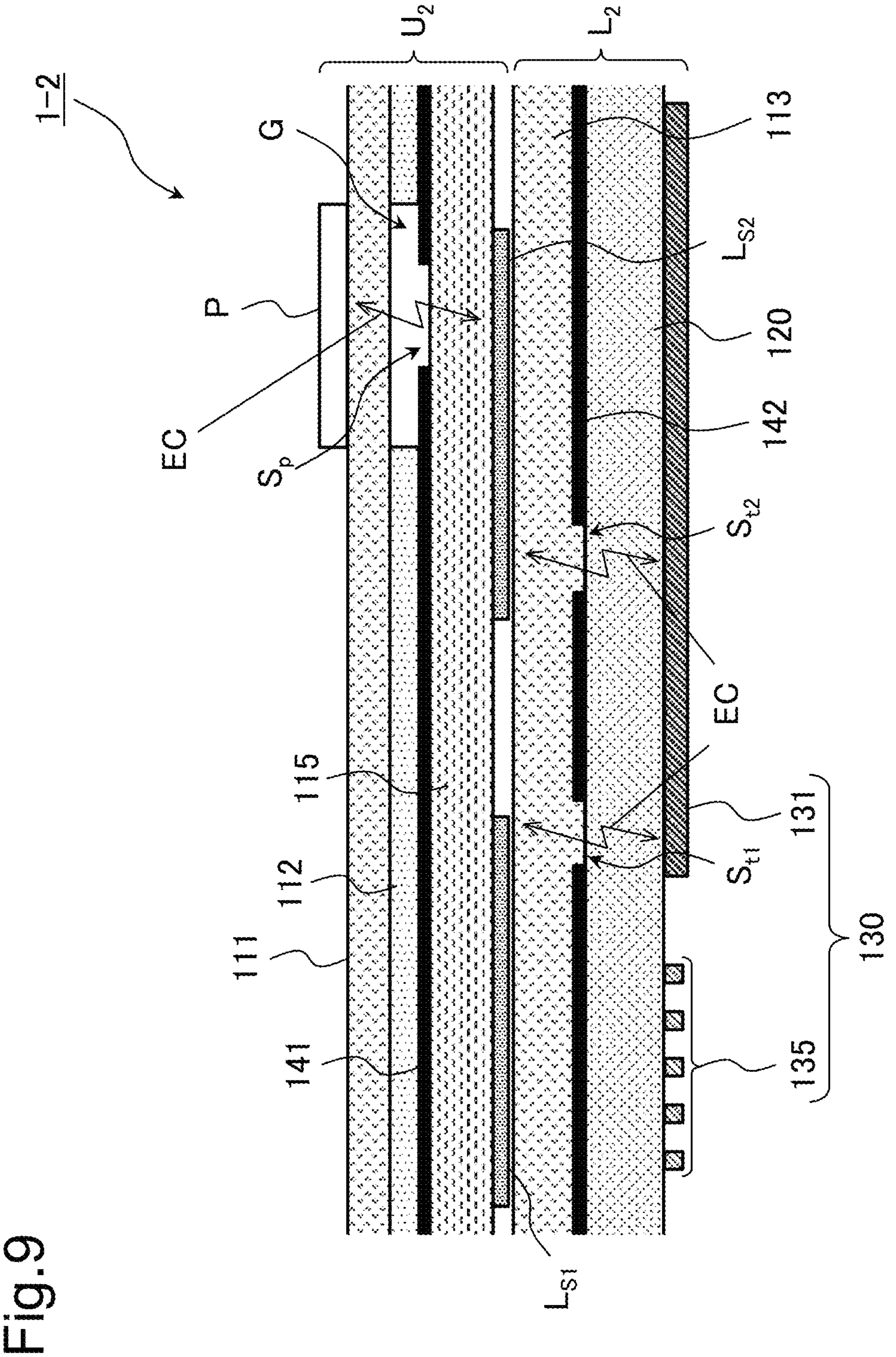
FIG. 9 is a conceptual diagram illustrating an example of a configuration of a planar antenna according to the present disclosure.

FIG. 9 is a cross-sectional view illustrating a cross section of part of a planar antenna in the present disclosure. A planar antenna 1-2 of the second modification is an example in which an upper layer structure $U_2$ and a lower layer structure $L_2$ are separately formed. The upper layer structure $U_2$ includes the patch antenna P, the signal line $L_{S1}$, and the signal line $L_{S2}$. The lower layer structure $L_2$ includes the TFT substrate 120 on which the TFT wiring 135 and the phase shifter layer 130 are disposed. A dielectric layer 115 is disposed at the lower part of the upper layer structure $U_2$. The ground layer 141 (first ground layer) is disposed between the second insulating layer 112 and the dielectric layer 115. The signal line $L_{S1}$ and the signal line $L_{S2}$ are formed on the lower face of the dielectric layer 115. In the ground layer 141, the patch slot $S_p$ is formed at the lower part of the patch antenna P. The third insulating layer 113 is formed at the upper part of the lower layer structure $L_2$. The ground layer 142 (second ground layer) is formed on a lower face of third insulating layer 113. The phase shifter slot $S_{t1}$ and the phase shifter slot $S_{t2}$ are formed in ground layer 142.

In the planar antenna 1-2, the signal line $L_{S2}$ and the phase shifter 131 formed in the phase shifter layer 130 are connected by the electromagnetic coupling EC. In the planar antenna 1-2, the signal line $L_{S2}$ and the patch antenna P are connected by the electromagnetic coupling EC. In the configuration of the present modification, the patch antenna P and the phase shifter 131 are separated by the ground layer 142. Therefore, the region of the phase shifter layer 130 can be expanded in the present modification as compared with the first modification.

Third Modification

Figure 10:
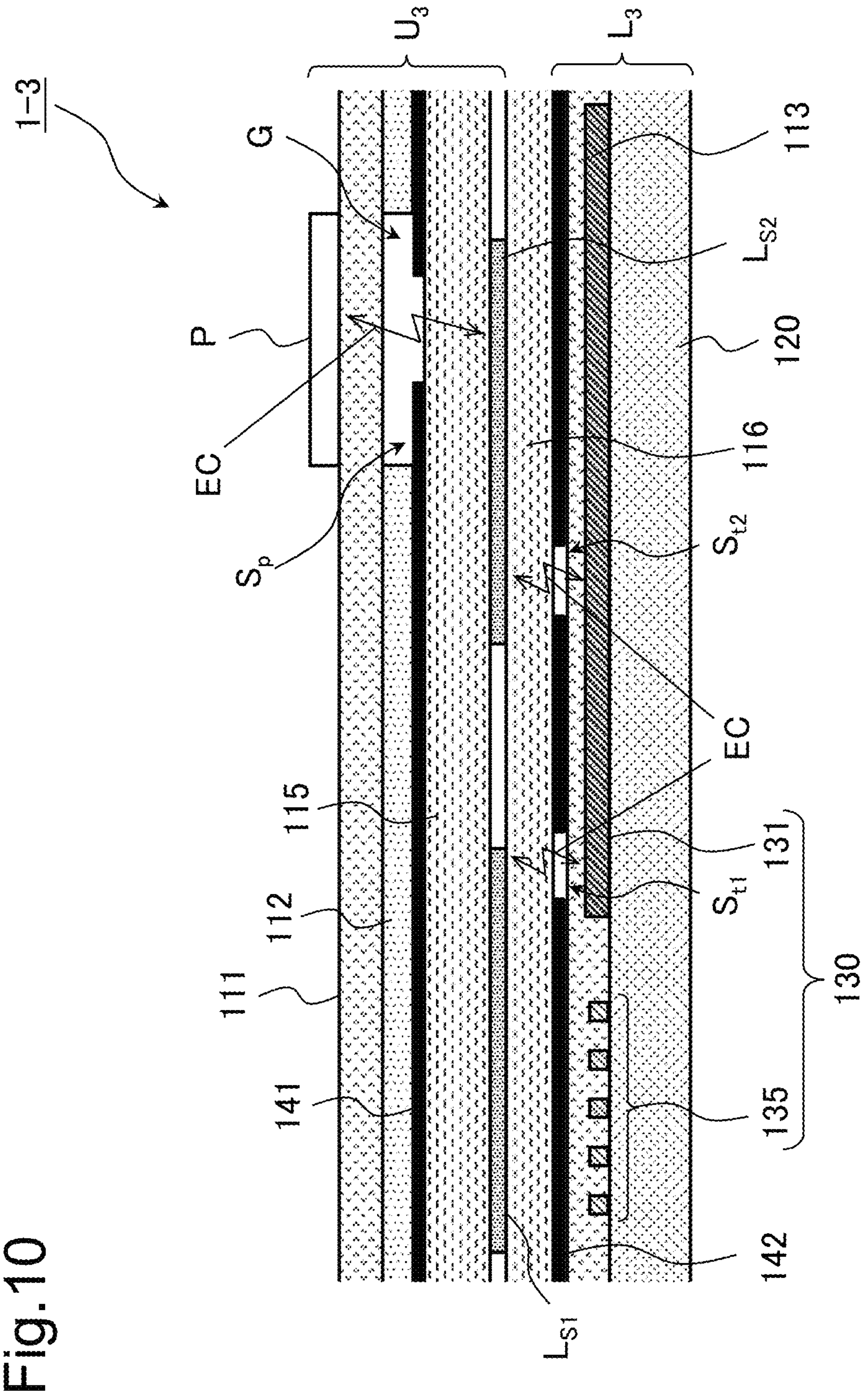
FIG. 10 is a conceptual diagram illustrating an example of a configuration of a planar antenna according to the present disclosure.

FIG. 10 is a cross-sectional view illustrating a cross section of part of a planar antenna in the present disclosure. A planar antenna 1-3 of the third modification is an example in which an upper layer structure $U_3$ and a lower layer structure $L_3$ are separately formed. The upper layer structure $U_3$ includes the patch antenna P, the signal line $L_{S1}$, and the signal line $L_{S2}$. The lower layer structure $L_3$ includes the TFT substrate 120 on which the TFT wiring 135 is disposed. The dielectric layer 115 is formed at the lower part of the upper layer structure $U_3$. The ground layer 141 (first ground layer) is disposed between the second insulating layer 112 and the dielectric layer 115. A signal line $L_S$ is disposed on the lower face of the dielectric layer 115. The ground layer 141 has a patch slot $S_p$ below the patch antenna P. In the lower layer structure $L_3$, the TFT wiring 135 and the phase shifter layer 130 are formed on the upper face of the TFT substrate 120. The third insulating layer 113 is formed on the upper face of the TFT substrate 120 in such a way as to cover the TFT wiring 135 and the phase shifter layer 130. The ground layer 142 (second ground layer) is disposed on an upper face of third insulating layer 113. The ground layer 142 has the phase shifter slot $S_{t1}$ and the phase shifter slot $S_{t2}$. The upper layer structure $U_3$ and the lower layer structure $L_3$ are stacked with the dielectric layer 116 interposed between the upper layer structure and the lower layer structure.

In the planar antenna 1-3, the signal line $L_{S1}$ and the phase shifter 131 formed in the phase shifter layer 130 are connected by the electromagnetic coupling EC. In the planar antenna 1-3, the signal line $L_{S2}$ and the patch antenna P are connected by the electromagnetic coupling EC. According to the present modification, the planar antenna 1-3 can be configured by sandwiching the dielectric layer 116 between the upper layer structure $U_3$ and the lower layer structure $L_3$. In the configuration of the present modification, the patch antenna P and the phase shifter 131 are separated by the ground layer 142. Therefore, the region of the phase shifter layer 130 can be expanded in the present modification, as compared with the first modification.

Fourth Modification

Figure 11:
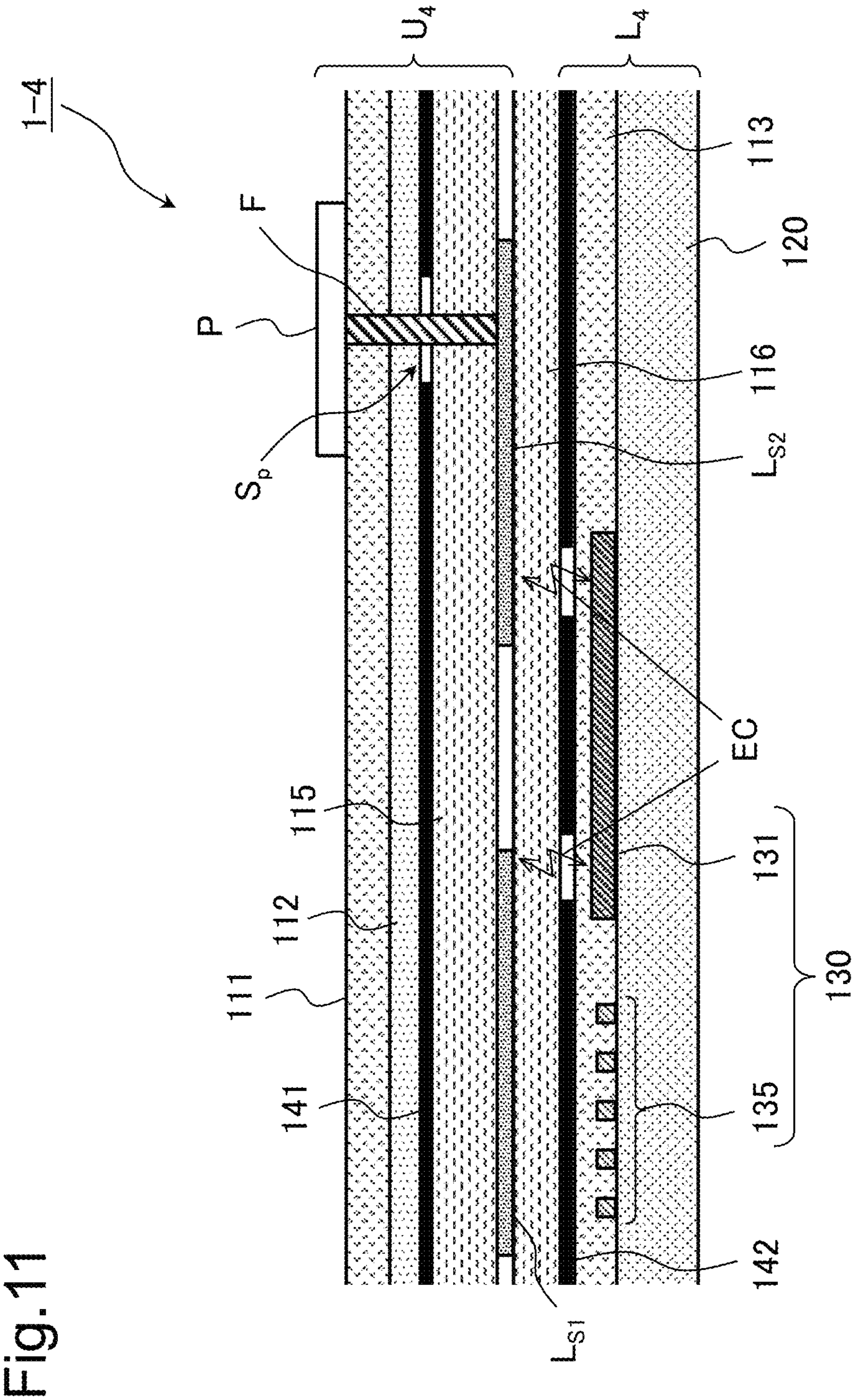
FIG. 11 is a conceptual diagram illustrating an example of a configuration of a planar antenna according to the present disclosure.

FIG. 11 is a cross-sectional view illustrating a cross section of part of a planar antenna in the present disclosure. A planar antenna 1-4 of the fourth modification is an example in which the patch antenna P and the signal line $L_S$ are electrically connected by a power supply line F in the configuration of the third modification (FIG. 10). In the planar antenna 1-4, a structure (upper layer structure $U_4$) including the patch antenna P and the signal line $L_S$ and the TFT substrate 120 (lower layer structure $L_4$) on which the signal line $L_S$ is disposed are separately formed. In the upper layer structure $U_4$, the patch antenna P and the signal line $L_S$ are connected by the power supply line F. In a case where a desired dielectric constant is obtained only with the first insulating layer 111, the second insulating layer 112 may be omitted.

In the planar antenna 1-4, the signal line $L_{S1}$ and the phase shifter 131 formed in the phase shifter layer 130 are connected by electromagnetic coupling. In the planar antenna 1-4, the signal line $L_{S2}$ and the patch antenna P are connected by the power supply line F. According to the present modification, it is possible to achieve the planar antenna 1-4 in which the electromagnetic power supply system and the coaxial power supply system are combined. As in the present modification, also in the second modification (FIG. 9) and the like, a configuration in which the patch antenna P and the signal line $L_S$ are electrically connected by the power supply line F can be applied.

Comparative Example

Next, comparative examples of the present example embodiment will be described with reference to the drawings. The following comparative example relates to a two-dimensional phased array antenna that drives a phase shifter with a TFT. In a case where the phase shifter is driven by the TFT, wiring used for selection of the phase shifter and writing of phase shift data is formed. In the following comparative example, a diagram in which a wiring portion is emphasized is used.

First Comparative Example

Figure 12:
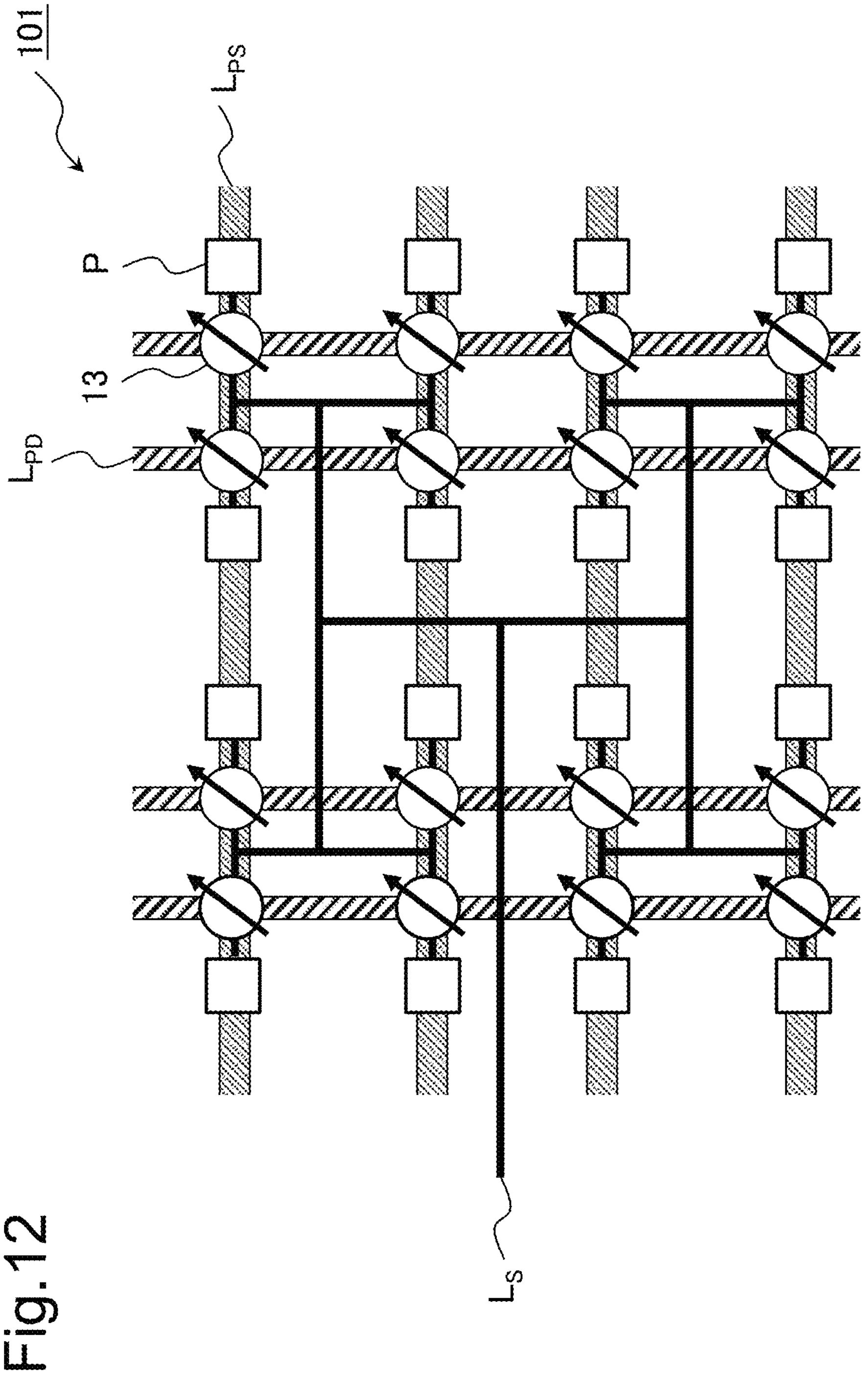
FIG. 12 is a conceptual diagram for describing an example of a planar antenna in a comparative example.

FIG. 12 is a plan view of a planar antenna according to the first comparative example. A planar antenna 101 of the present comparative example includes a plurality of patch antennas P and a plurality of phase shifters 13 disposed in a lattice pattern. The planar antenna 101 includes a plurality of selection lines $L_{PS}$ and a plurality of data lines $L_{PD}$. Furthermore, the planar antenna 101 includes a signal line $L_S$ for transmitting a signal (radio wave) emitted from the patch antenna P.

The plurality of selection lines $L_{PS}$ is extended in the row direction. Each of the plurality of selection lines $L_{PS}$ passes through the plurality of phase shifters 13 disposed in the row direction. Each of the plurality of selection lines $L_{PS}$ passes beneath the plurality of patch antennas P disposed in the row direction. The selection line $L_{PS}$ is used to select the phase shifter 13.

The plurality of data lines $L_{PD}$ is extended in the column direction. Each of the plurality of data lines $L_{PD}$ passes through the plurality of phase shifters 13 disposed in the column direction. The data line $L_{PD}$ is used for writing phase shift data to the phase shifter 13.

In the layout of the present comparative example, the signal line $L_S$ intersects the selection line $L_{PS}$ and the data line $L_{PD}$ at a plurality of locations. Interference may occur at a portion where the signal line $L_S$ and the wiring intersect. In the layout of the present comparative example, there is also a portion where the selection line $L_{PS}$ and the patch antenna P intersect.

Second Comparative Example

Figure 13:
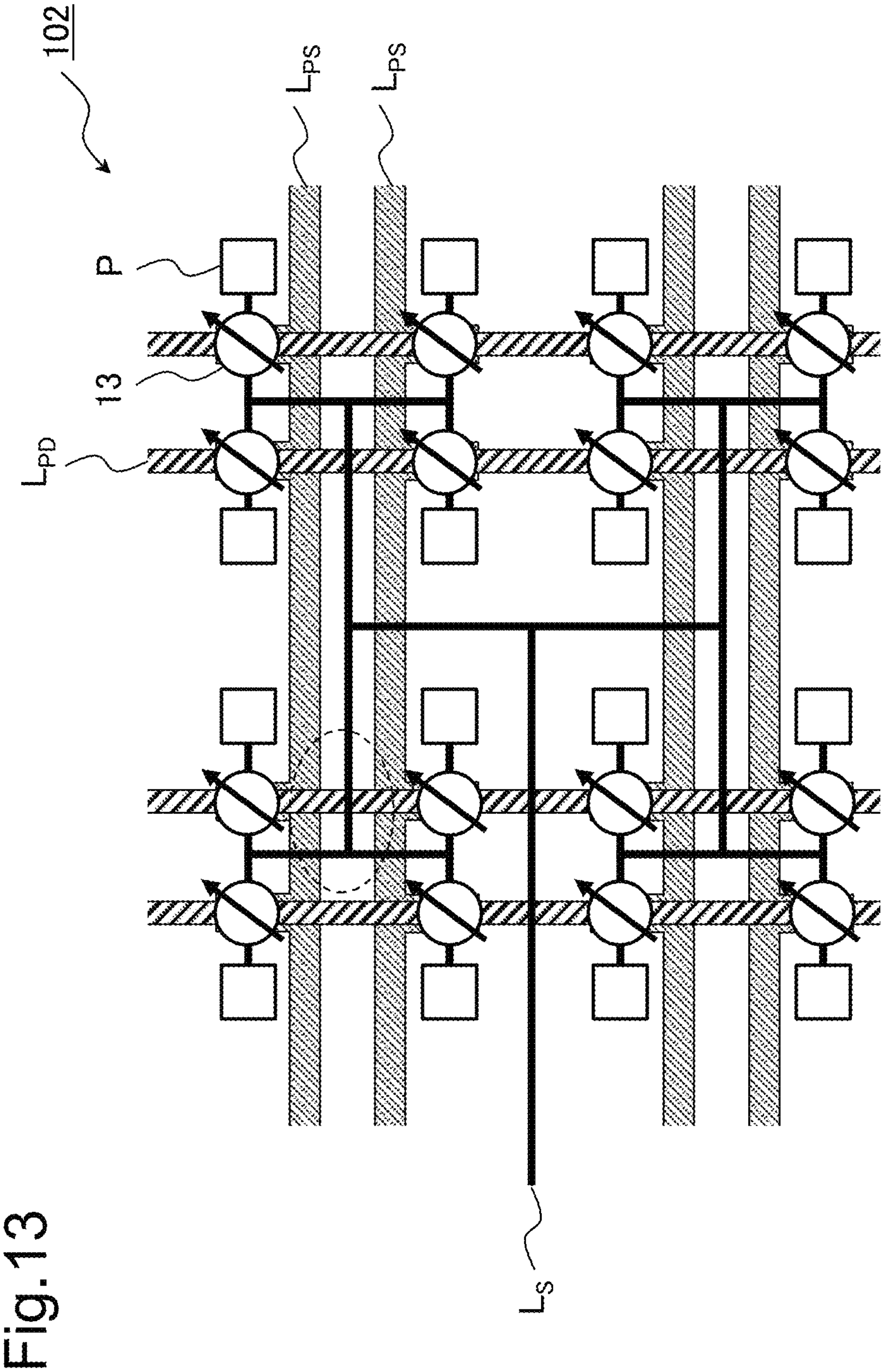
FIG. 13 is a conceptual diagram for describing an example of a planar antenna in a comparative example.

FIG. 13 is a plan view of a planar antenna according to the second comparative example. A planar antenna 102 of the present comparative example includes a plurality of patch antennas P and a plurality of phase shifters 13 disposed in a lattice pattern. The planar antenna 102 includes a plurality of selection lines $L_{PS}$ and a plurality of data lines $L_{PD}$. Furthermore, the planar antenna 102 includes a signal line $L_S$ for transmitting a signal (radio wave) emitted from the patch antenna P.

The plurality of selection lines $L_{PS}$ is extended in the row direction. Each of the plurality of selection lines $L_{PS}$ is disposed avoiding the plurality of phase shifters 13 disposed in the row direction. Each of the plurality of selection lines $L_{PS}$ is disposed avoiding the plurality of patch antennas P disposed in the row direction. The selection line $L_{PS}$ is used to select the phase shifter 13.

The plurality of data lines $L_{PD}$ is extended in the column direction. Each of the plurality of data lines $L_{PD}$ passes through the plurality of phase shifters 13 disposed in the column direction. The data line $L_{PD}$ is used for writing phase shift data to the phase shifter 13.

In the layout of the present comparative example, there is no portion where the selection line $L_{PS}$ and the patch antenna P intersect. Therefore, according to the present comparative example, the interference between the selection line $L_{PS}$ and the patch antenna P is reduced, as compared with the first comparative example. However, in the layout of the present comparative example, the selection line $L_{PS}$ and the data line $L_{PD}$ intersect with the signal line $L_S$ at a plurality of locations.

Figure 14:
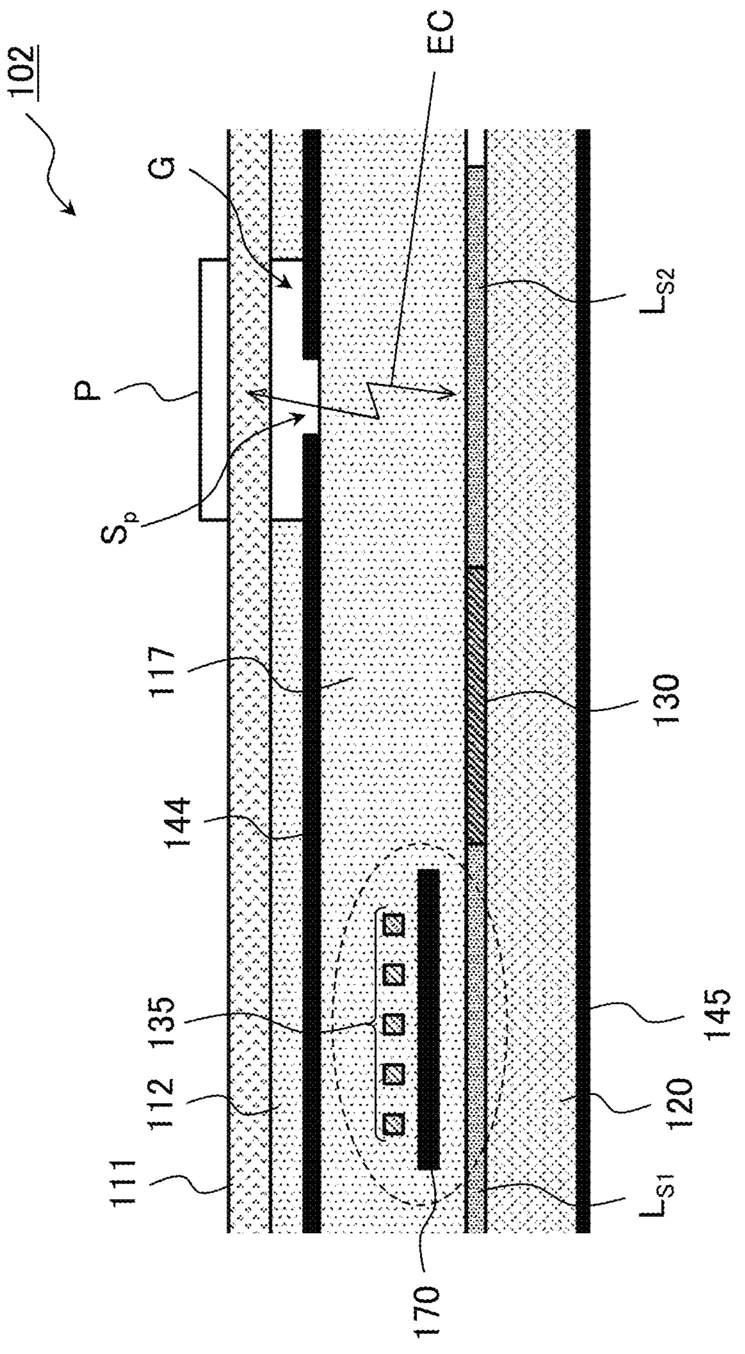
FIG. 14 is a conceptual diagram illustrating an example of a configuration of a planar antenna in a comparative example.

FIG. 14 is a cross-sectional view of a planar antenna of the present comparative example. The planar antenna 102 includes a patch antenna P, a first insulating layer 111, a second insulating layer 112, a dielectric layer 117, a phase shifter layer 130, a TFT substrate 120, TFT wiring 135, a ground layer 144, a ground layer 145, and a separation layer 170.

A plurality of patch antennas P are disposed on the upper face of the first insulating layer 111. The plurality of patch antennas P are disposed in a two-dimensional lattice pattern. The plurality of patch antennas P disposed in a two-dimensional lattice form constitutes a phased array antenna. The second insulating layer 112 is disposed on the lower face of the first insulating layer 111. The second insulating layer 112 has an opening in the lower region of the patch antenna P. The opening portion of the second insulating layer 112 forms an air gap G related to the thickness of the second insulating layer 112. The ground layer 144 is disposed on the lower face of the second insulating layer 112. The ground layer 144 has a patch slot $S_p$ in a lower region of the patch antenna P. The lower face of the ground layer 144 is in contact with the upper face of the dielectric layer 117.

In the layout of FIG. 14, phase shifter layer 130 is formed on the upper face of the TFT substrate 120. The signal line $L_{S1}$ and the signal line $L_{S2}$ are formed on the upper face of the TFT substrate 120. The phase shifter layer 130, the signal line $L_{S1}$, and the signal line $L_{S2}$ are formed in the same layer. The upper faces of the phase shifter layer 130, the signal line $L_{S1}$, and the signal line $L_{S2}$ are in contact with the lower face of the dielectric layer 117. The ground layer 145 is formed on a lower face of the TFT substrate 120. The signal line $L_{S2}$ is coupled to the patch antenna P by the electromagnetic coupling EC via the upper patch slot $S_p$ and the upper air gap G. A signal supplied from a signal source (not illustrated) to the signal line $L_{S1}$ is phase-shifted by the phase shifter 13 formed in the phase shifter layer 130 and propagated to the patch antenna P via the patch slot $S_p$ and the air gap G above the signal line $L_{S2}$.

In the layout of FIG. 14, the separation layer 170 is formed. The separation layer 170 is disposed between the ground layer 144 and the signal line $L_S$. The separation layer 170 prevents interference at an intersection between the TFT wiring 135 and the signal line $L_S$. In the case of the layout of FIG. 14, the characteristic impedance fluctuates in the vicinity of the separation layer 170.

Unlike the comparative example described above, in the present example embodiment, a ground layer is interposed between the signal line $L_S$ and the TFT wiring. The ground layer is uniformly formed along an insulating layer (dielectric layer) between the signal lines (the signal line $L_{S1}$ and the signal line $L_{S2}$) and the TFT wiring and a face of the TFT substrate. Therefore, as compared with the comparative example, according to the present example embodiment, interference can be prevented without locally providing a separation layer at an intersection between the signal line (the signal line $L_{S1}$ and the signal line $L_{S2}$) and the TFT wiring, and thus fluctuation in characteristic impedance is reduced.

As described above, the planar antenna of the present example embodiment includes a plurality of patch antennas, a substrate, a signal line, and a ground layer. The plurality of patch antennas are disposed in a two-dimensional array. The plurality of patch antennas disposed in a two-dimensional array form an antenna array. A phase shifter layer including a phase shifter and wiring is formed on the substrate. The phase shifter is associated with each of the plurality of patch antennas. The wiring is used to control the phase shifter. A communication signal propagates through the signal line. The ground layer is disposed between the phase shifter layer and the signal line. The ground layer has a slot at least between the signal line and the phase shifter.

In the planar antenna of the present example embodiment, the wiring of the phase shifter layer and the signal line are formed in different layers. The wiring of the phase shifter layer and the signal line are separated via the ground layer. Therefore, according to the present example embodiment, the fluctuation, in the characteristic impedance in the signal line, that may occur at the location where the wiring of the phase shifter layer and the signal line intersect is suppressed.

In an aspect of the present example embodiment, the ground layer has a phase shifter slot below the phase shifter. The signal line and the phase shifter are connected by electromagnetic coupling via the phase shifter slot. According to the present aspect, the signal line and the phase shifter can be connected by electromagnetic coupling via the phase shifter slot formed in the ground layer.

In an aspect of the present example embodiment, the signal line includes a first signal line and a second signal line. The first signal line extends from the signal source to below or above the first end of the phase shifter. The second signal line extends from below or above the second end of the phase shifter to below the patch antenna. The first signal line is connected to the first end of the phase shifter by electromagnetic coupling. The second signal line is connected to the second end of the phase shifter by electromagnetic coupling. According to the present aspect, the signal propagated through the first signal line can be transmitted to the phase shifter by electromagnetic coupling, and the phase shifter can shift the signal.

In an aspect of the present example embodiment, the first signal line is disposed avoiding a lower region of the patch antenna in plan view. According to the present aspect, since the patch antenna and the first signal line do not intersect in plan view, interference between the patch antenna and the first signal line is prevented.

In an aspect of the present example embodiment, the ground layer has a patch slot below the patch antenna. The signal line and the patch antenna are connected via the patch slot. According to the present aspect, the signal line and the patch antenna can be connected via the patch slot formed in the ground layer.

In an aspect of the present example embodiment, the signal line and the patch antenna are connected by electromagnetic coupling via the patch slot. According to the present aspect, the signal line and the patch antenna can be connected by electromagnetic coupling via the patch slot formed in the ground layer.

In an aspect of the present example embodiment, the signal line and the patch antenna are connected by a power supply line via the patch slot. According to the present aspect, the signal line and the patch antenna can be connected by the power supply line via the patch slot formed in the ground layer.

In an aspect of the present example embodiment, the ground layer is divided into a first ground layer in which a patch slot is formed and a second ground layer in which a phase shifter slot is formed. The signal line is disposed between the first ground layer and the second ground layer. According to the present aspect, the characteristic impedance of the signal line is easily maintained by disposing the signal line between the two ground layers. According to the present aspect, the layout of the internal structure of the planar antenna can be diversified by dividing the ground layer into two layers.

Antenna devices compatible with electromagnetic waves in a high frequency band have been developed for mobile communication of a Beyond 5 Generation (B5G) subsequent to a 5 Generation (5G). In B5G, in order to cope with an increase in communication capacity, use of a millimeter wave or a terahertz wave is expected. Compared to radio waves used before 5G, millimeter waves and terahertz waves are easily attenuated. Therefore, the millimeter wave or the terahertz wave has a shorter communication distance than the radio wave used before 5G. When the number of elements mounted on the antenna device can be increased to a scale of 10,000, it is possible to compensate for shortening of the communication distance by improving the antenna gain. However, when the number of elements increases to a scale of 10,000, there is a possibility that a portion where a wiring line used for selection of a phase shifter or writing of data and a signal line intersect with each other and interfere with each other. When a wiring line used for selecting a phase shifter or writing data and a signal line interfere with each other, the characteristic impedance of the signal line may fluctuate. According to the configuration of the present example embodiment, since the ground layer is disposed between the wiring and the signal line, the wiring and the signal line hardly interfere with each other. Therefore, according to the present example embodiment, the fluctuation in the characteristic impedance in the signal line, that may occur at the location where the wiring of the phase shifter layer and the signal line intersect is suppressed.

Second Example Embodiment

Next, an antenna device according to a second example embodiment will be described with reference to the drawings. An antenna device of the present disclosure includes the planar antenna according to the first example embodiment. The antenna device of the present example embodiment has a configuration in which a signal source and a circuit are added to the planar antenna according to the first example embodiment. The following configuration is an example, and does not limit the configuration of the antenna device of the present disclosure.

Configuration

Figure 15:
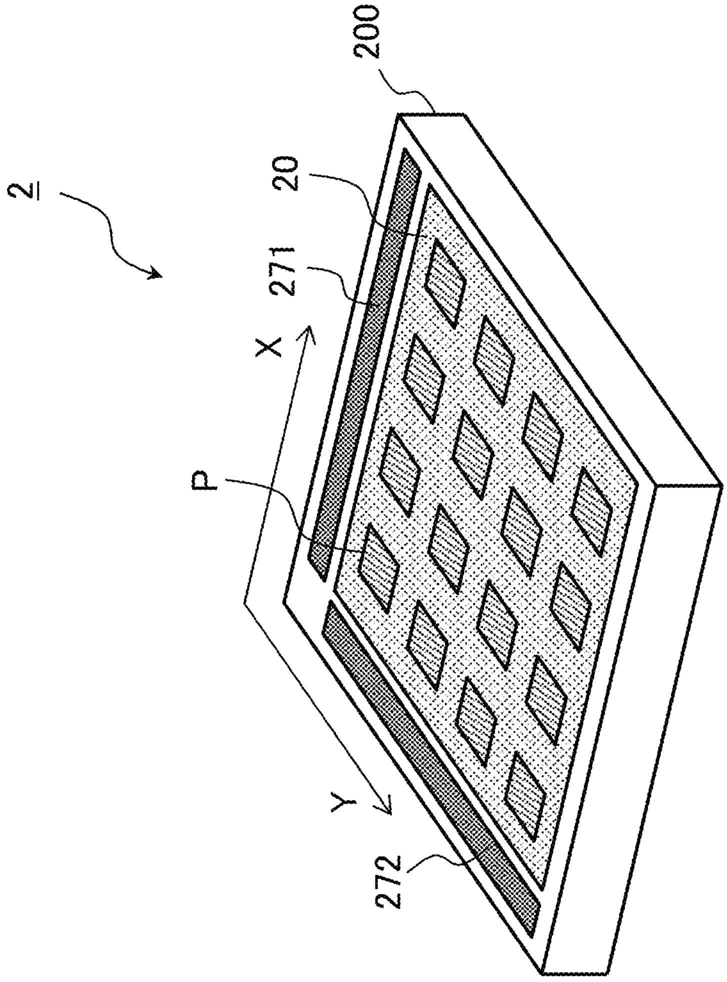
FIG. 15 is a conceptual diagram illustrating an example of an antenna device according to the present disclosure.

FIG. 15 is a conceptual diagram illustrating an example of a configuration of an antenna device according to the present disclosure. FIG. 15 illustrates an example of an external appearance of the antenna device. An antenna device 2 includes a planar antenna 200. The planar antenna 200 includes the planar antenna of the first example embodiment. Details of the planar antenna 200 will not be described. On the upper face of the planar antenna 200, an antenna array 20 including a plurality of patch antennas P disposed in a two-dimensional array is disposed. In the example of FIG. 15, the plurality of patch antennas P is arrayed along the X direction and the Y direction. The plurality of patch antennas P is phased arrayed.

A first drive circuit 271 and a second drive circuit 272 are mounted on antenna device 2. The first drive circuit 271 and the second drive circuit 272 are circuits used to designate the patch antennas P to be driven. By driving the first drive circuit 271 and the second drive circuit 272, the address associated with each patch antenna P can be designated. For example, the first drive circuit 271 and the second drive circuit 272 are formed on the surface of the planar antenna 200. The first drive circuit 271 and the second drive circuit 272 may be formed inside the planar antenna 200.

Figure 16:
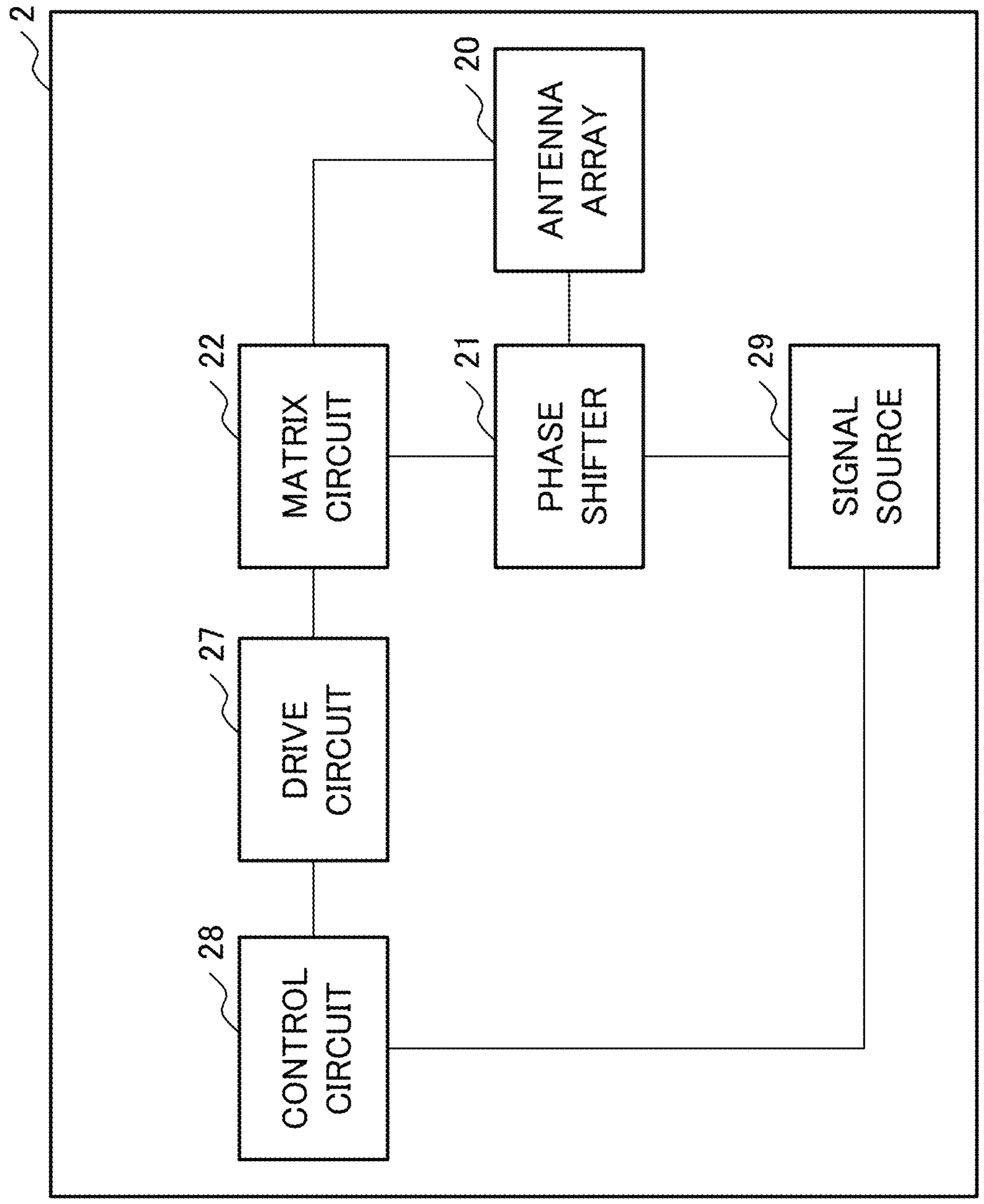
FIG. 16 is a block diagram illustrating an example of a configuration of an antenna device according to the present disclosure.

FIG. 16 is a block diagram illustrating an example of a configuration of the antenna device 2. The antenna device 2 includes an antenna array 20, a phase shifter 21, a matrix circuit 22, a drive circuit 27, a control circuit 28, and a signal source 29.

The patch antenna P is a plate-shaped radiating element. In the present example embodiment, the patch antenna P has a square shape. The shape of the patch antenna P is not limited to a square shape, and may be a circular shape or other shapes.

An air gap and a slot are opened below the patch antenna P. The patch antenna P is connected to a signal line by electromagnetic coupling via an air gap and a slot formed below. The patch antenna P is an open type resonator. The patch antenna P resonates at a frequency that matches an integral multiple of ½ wavelength of the length of the patch antenna P. The size of the patch antenna P is set in accordance with the wavelength of the radio wave used for communication.

The matrix circuit 22 has a configuration in which a plurality of thin film transistors (TFT) is disposed in a two-dimensional array. The matrix circuit 22 is formed using a TFT processing technology. For example, a ground layer is formed above the matrix circuit 22. The ground layer is formed to prevent electromagnetic coupling above and below the ground layer. For example, the ground layer includes an electric conductor. The potential of the ground layer is basically a ground potential. Therefore, a capacitance related to the dielectric constant of the dielectric layer such as the insulating layer or the TFT substrate is formed between the signal line included in the phase shifter 21 and the ground layer. Each of the plurality of TFTs included in the matrix circuit 22 is associated with one of the plurality of patch antennas P included in the antenna array 20. For example, the TFT includes a semiconductor layer such as amorphous silicon, polysilicon, or an oxide semiconductor.

The phase shifter 21 is disposed for each antenna unit. The phase shifter 21 is any of the phase shifters included in the planar antenna of the first example embodiment.

The drive circuit 27 includes the first drive circuit 271 and the second drive circuit 272. The first drive circuit 271 is a circuit for performing addressing in the X direction. The second drive circuit 272 is a circuit for performing addressing in the Y direction. The drive circuit 27 drives the first drive circuit 271 and the second drive circuit 272 to designate an address associated with each patch antenna P. The drive circuit 27 drives the plurality of TFTs included in the matrix circuit 22 under the control of the control circuit 28. The drive circuit 27 individually drives the plurality of TFTs disposed in a two-dimensional array.

The control circuit 28 drives the drive circuit 27 in accordance with a control signal from the outside. The control circuit 28 drives the drive circuit 27 by an active matrix drive system. The control circuit 28 outputs a control signal from the outside to the signal source 29. For example, the control circuit 28 is achieved by a microcomputer or a microcontroller. For example, the control circuit 28 includes a central processing unit (CPU), a random access memory (RAM), a read only memory (ROM), a flash memory, and the like. The control circuit 28 executes control and processing according to a program stored in advance. The control circuit 28 executes control and processing according to a program according to a preset schedule and timing, an external control instruction, and the like. For example, the control circuit 28 controls the antenna array 20 including the plurality of patch antennas P included in the planar antenna 200 to transmit a radio wave having directivity from the antenna array 20. As described above, the antenna array 20 is used as a phased array antenna.

The signal source 29 is connected to a plurality of switch groups SW included in the phase shifter 21. The signal source 29 is connected to the control circuit 28. The signal source 29 acquires a control signal from the control circuit 28. The signal source 29 controls ON/OFF of the plurality of switch groups SW according to the control signal. The signal source 29 may be configured to directly receive a control signal from the outside without going through the control circuit 28.

The signal reaching the signal input unit of the phase shifter 21 through a signal line (not illustrated) connected to the TFT in the ON state is phase-shifted by the line length set in the phase shifter 21 and the phase shift amount according to the dielectric constant of the dielectric such as the insulating layer or the TFT substrate. The phase-shifted signal propagates from the signal line to the patch antenna P by electromagnetic coupling. The signal propagated to the patch antenna P is transmitted from the patch antenna P as a radio wave to be transmitted. The radio wave transmitted from the patch antenna P is based on a signal output from a transmission circuit (not illustrated). The information included in the signal is not particularly limited.

The radio wave received by the patch antenna P is received according to the capacitance based on the dielectric constant of the dielectric such as the insulating layer or the TFT substrate interposed between the patch antenna P and the signal line. The phase of the received radio wave is shifted by the line length set in the phase shifter 21 and the phase shift amount according to the dielectric constant of the dielectric such as the insulating layer and the TFT substrate. The phase-shifted signal is received by a reception circuit (not illustrated) through a signal line. Information included in the signal received by the reception circuit is decoded by a decoder (not illustrated).

As described above, the antenna device of the present example embodiment includes the planar antenna, the signal source, the matrix circuit, the drive circuit, and the control circuit according to the first example embodiment. The signal source is connected to a signal line included in the planar antenna. The matrix circuit has a structure in which a plurality of thin film transistors connected to wiring included in a planar antenna are disposed in a two-dimensional array. The drive circuit drives a thin film transistor included in the matrix circuit. The control circuit drives the drive circuit according to the control signal. The antenna device of the present aspect includes the planar antenna according to the first example embodiment. Therefore, according to the present aspect, it is possible to provide the antenna device in which the fluctuation in the characteristic impedance in the signal line included in the planar antenna is suppressed.

In an aspect of the present example embodiment, the control circuit controls the plurality of patch antennas included in the planar antenna to transmit a radio wave having directivity from the antenna array including the plurality of patch antennas. According to the present aspect, an antenna array including a plurality of patch antennas can be used as a phased array antenna.

Third Example Embodiment

Figure 17:
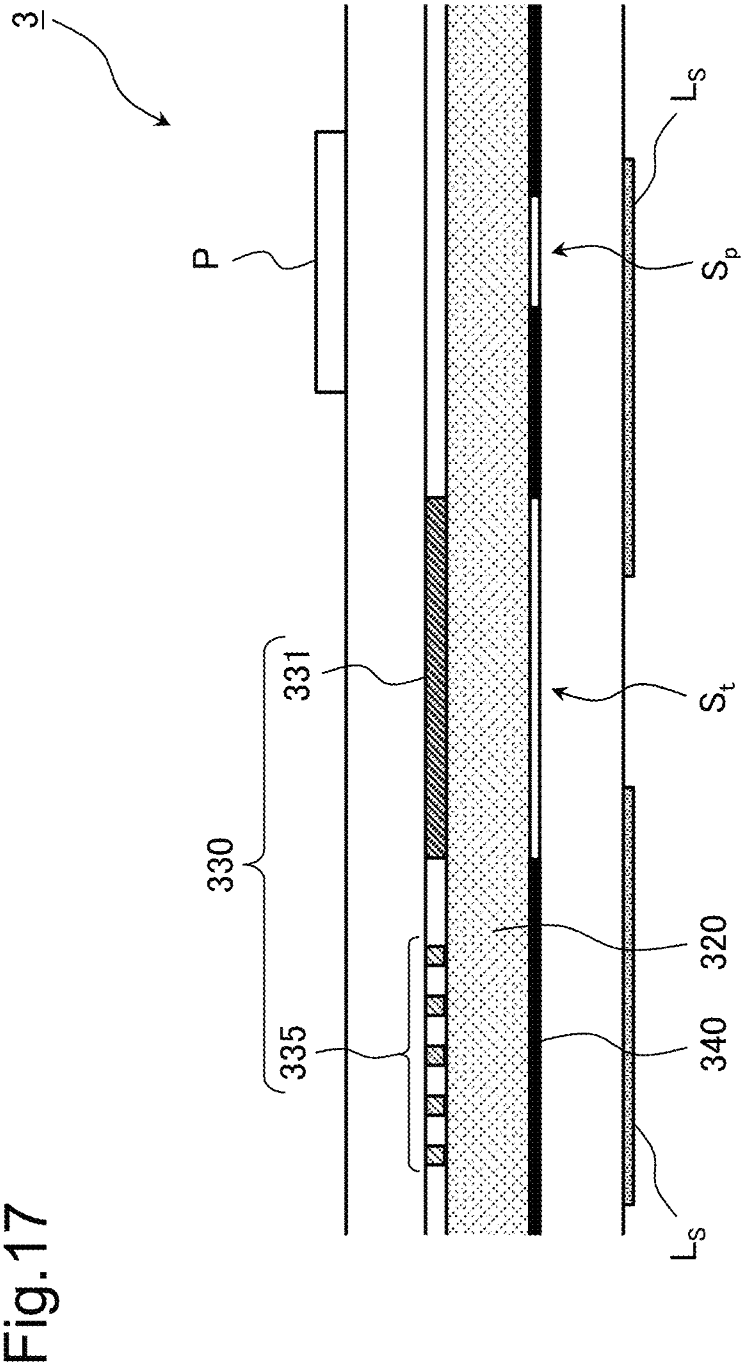
FIG. 17 is a conceptual diagram illustrating an example of a configuration of a planar antenna according to the present disclosure.

Next, a planar antenna according to a third example embodiment will be described with reference to the drawings. The planar antenna of the present example embodiment has a configuration in which the planar antenna of the first example embodiment is simplified. FIG. 17 is a conceptual diagram illustrating an example of a configuration of a planar antenna according to the present disclosure. A planar antenna 3 includes a plurality of patch antennas P, a substrate 320, a signal line $L_S$, and a ground layer 340.

The plurality of patch antennas P are disposed in a two-dimensional array. The plurality of patch antennas P disposed in a two-dimensional array form an antenna array. The phase shifter layer 330 including a phase shifter 331 and wiring 335 is formed on substrate 320. The phase shifter 331 is associated with each of the plurality of patch antennas P. The wiring 335 is used to control the phase shifter 331. A communication signal propagates through the signal line $L_S$. The ground layer 340 are disposed between the phase shifter layer 330 and the signal line $L_S$. The ground layer 340 has a slot at least between the signal line $L_S$ and the phase shifter 331.

In the planar antenna of the present example embodiment, the wiring of the phase shifter layer and the signal line are formed in different layers. The wiring of the phase shifter layer and the signal line are separated via the ground layer. Therefore, according to the present example embodiment, the fluctuation in the characteristic impedance in the signal line, that may occur at the location where the wiring of the phase shifter layer and the signal line intersect, is suppressed.

Hardware

Next, a hardware configuration for executing control and processing in the present disclosure will be described with reference to the drawings. An example of such a hardware configuration is an information processing device 90 (computer) in FIG. 18. The information processing device 90 in FIG. 18 is a configuration example for executing control and processing in the present disclosure, and does not limit the scope of the present disclosure.

Figure 18:
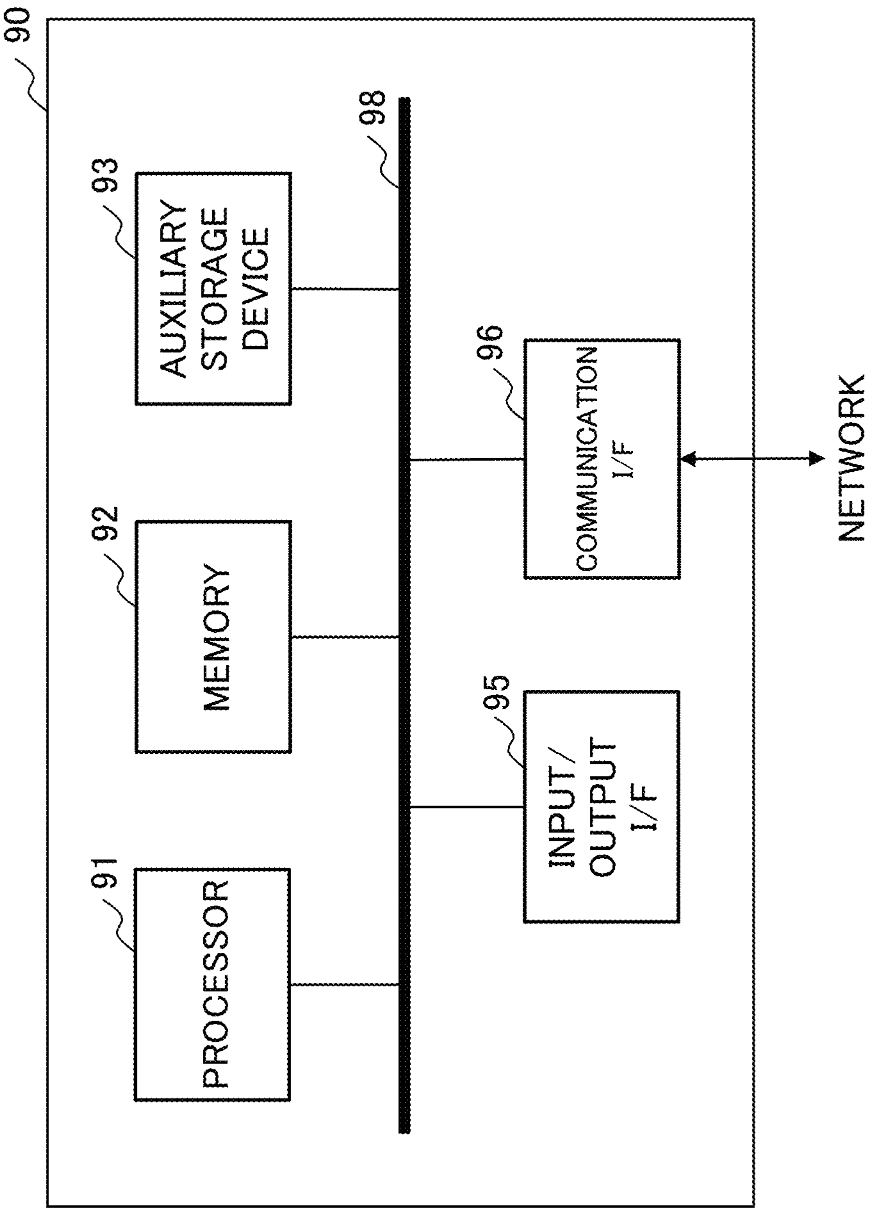
FIG. 18 is a block diagram illustrating an example of a hardware configuration that executes control and processing according to each example embodiment.

As illustrated in FIG. 18, the information processing device 90 includes a processor 91, a memory 92, an auxiliary storage device 93, an input/output interface 95, and a communication interface 96. In FIG. 18, the interface is abbreviated as an interface (I/F). The processor 91, the memory 92, the auxiliary storage device 93, the input/output interface 95, and the communication interface 96 are data-communicably connected to each other via a bus 98. The processor 91, the memory 92, the auxiliary storage device 93, and the input/output interface 95 are connected to a network such as the Internet or an intranet via the communication interface 96.

The processor 91 develops a program (instruction) stored in the auxiliary storage device 93 or the like in the memory 92. For example, the program is a software program for executing control and processing in the present disclosure. The processor 91 executes the program developed in the memory 92. The processor 91 executes control and processing in the present disclosure by executing a program.

The memory 92 is a memory having an area in which a program is developed. A program stored in the auxiliary storage device 93 or the like is developed in the memory 92 by the processor 91. The memory 92 is achieved by, for example, a volatile memory such as a dynamic random access memory (DRAM). A nonvolatile memory such as a magnetoresistive random access memory (MRAM) may be applied as the memory 92.

The auxiliary storage device 93 stores various pieces of data such as programs. For example, the auxiliary storage device 93 is achieved by a local disk such as a hard disk or a flash memory. Various pieces of data may be stored in the memory 92, and the auxiliary storage device 93 may be omitted.

The input/output interface 95 is an interface that connects the information processing device 90 with a peripheral device based on a standard or a specification. The communication interface 96 is an interface that connects to an external system or a device through a network such as the Internet or an intranet in accordance with a standard or a specification. As an interface connected to an external device, the input/output interface 95 and the communication interface 96 may be shared.

An input device such as a keyboard, a mouse, or a touch panel may be connected to the information processing device 90 as necessary. These input devices are used to input of information and settings. In a case where a touch panel is used as the input device, a screen having a touch panel function serves as an interface. The processor 91 and the input device are connected via the input/output interface 95.

The information processing device 90 may be provided with a display device that displays information. In a case where a display device is provided, the information processing device 90 includes a display control device (not illustrated) that controls display of the display device. The information processing device 90 and the display device are connected via the input/output interface 95.

The information processing device 90 may be provided with a drive device. The drive device mediates reading of data and a program stored in a recording medium and writing of a processing result of the information processing device 90 to the recording medium between the processor 91 and the recording medium (program recording medium). The information processing device 90 and the drive device are connected via an input/output interface 95.

The above is an example of a hardware configuration for enabling control and processing in the present disclosure. The hardware configuration of FIG. 18 is an example of a hardware configuration for executing control and processing in the present disclosure, and does not limit the scope of the present disclosure. A program for causing a computer to execute control and processing in the present disclosure is also included in the scope of the present disclosure.

A program recording medium in which a program for executing processing in the present example embodiment is recorded is also included in the scope of the present disclosure. For example, the program recording medium is a computer-readable non-transitory recording medium. The recording medium can be achieved by, for example, an optical recording medium such as a compact disc (CD) or a digital versatile disc (DVD). The recording medium may be achieved by a semiconductor recording medium such as a Universal Serial Bus (USB) memory or a secure digital (SD) card. The recording medium may be achieved by a magnetic recording medium such as a flexible disk, or another recording medium.

The components in the present disclosure may be combined in any manner. The components in the present disclosure may be implemented by software. The components in the present disclosure may be implemented by a circuit.

The previous description of embodiments is provided to enable a person skilled in the art to make and use the present disclosure. Moreover, various modifications to these example embodiments will be readily apparent to those skilled in the art, and the generic principles and specific examples defined herein may be applied to other embodiments without the use of inventive faculty. Therefore, the present disclosure is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

Some or all of the above example embodiments may be described as the following Supplementary notes, but are not limited to the following. In the following Supplementary notes, each category's dependent term may also be dependent on other categories. The description included in the following Supplementary notes has significance as a basis for amendment.

Supplementary Note 1

A planar antenna including an antenna array in which a plurality of patch antennas are disposed in a two-dimensional array, a substrate on which a phase shifter layer including a phase shifter associated with each of the plurality of patch antennas and wiring used for controlling the phase shifter is formed, a signal line through which a communication signal propagates, and a ground layer disposed between the phase shifter layer and the signal line, and having a slot formed at least between the signal line and the phase shifter.

Supplementary Note 2

The planar antenna according to Supplementary Note 1, wherein the ground layer has a phase shifter slot below the phase shifter, and the signal line and the phase shifter are connected by electromagnetic coupling via the phase shifter slot.

Supplementary Note 3

The planar antenna according to Supplementary Note 2, wherein the signal line includes a first signal line extending from a signal source to below or above a first end of the phase shifter and a second signal line extending from below or above a second end of the phase shifter to below the patch antenna, and wherein the first signal line is connected to the first end of the phase shifter by electromagnetic coupling, and the second signal line is connected to the second end of the phase shifter by electromagnetic coupling.

Supplementary Note 4

The planar antenna according to Supplementary Note 3, wherein the first signal line is disposed while avoiding a lower region of the patch antenna in plan view.

Supplementary Note 5

The planar antenna according to Supplementary Note 2, wherein the ground layer has a patch slot below the patch antenna, and the signal line and the patch antenna are connected via the patch slot.

Supplementary Note 6

The planar antenna according to Supplementary Note 5, wherein the signal line and the patch antenna are connected by electromagnetic coupling via the patch slot.

Supplementary Note 7

The planar antenna according to Supplementary Note 5, wherein the signal line and the patch antenna are connected by a power supply line via the patch slot.

Supplementary Note 8

The planar antenna according to Supplementary Note 5, wherein the ground layer is divided into a first ground layer having the patch slot and a second ground layer having the phase shifter slot, and the signal line is disposed between the first ground layer and the second ground layer.

Supplementary Note 9

An antenna device including the planar antenna according to any one of Supplementary Notes 1 to 8, a signal source connected to the signal line included in the planar antenna, a matrix circuit in which a plurality of thin film transistors connected to wiring included in the planar antenna are disposed in a two-dimensional array, a drive circuit that drives the thin film transistor included in the matrix circuit, and a control circuit that drives the drive circuit in accordance with a control signal.

Supplementary Note 10

The antenna device according to Supplementary Note 9, wherein the control circuit causes the plurality of patch antennas included in the planar antenna to transmit a radio wave having directivity from the antenna array configured by the plurality of patch antennas.

The invention claimed is:

1. A planar antenna comprising:

an antenna array in which a plurality of patch antennas are disposed in a two-dimensional array;

a substrate on which a phase shifter layer including a phase shifter associated with each of the plurality of patch antennas and wiring used for controlling the phase shifter is formed;

a signal line through which a communication signal propagates; and a single ground layer disposed between the phase shifter layer and the signal line, and having a slot formed at least between the signal line and the phase shifter, wherein the wiring includes selection lines and data lines, the signal line intersects with the selection lines and the data lines, the single ground layer is positioned between both the phase shifter and the wiring on one side and the signal line on an opposite side, and the single ground layer prevents interference at locations where the signal line intersects with the selection lines and the data lines.

2. The planar antenna according to claim 1, wherein the single ground layer has a phase shifter slot below the phase shifter, and the signal line and the phase shifter are connected by electromagnetic coupling via the phase shifter slot.

3. The planar antenna according to claim 2, wherein the signal line includes a first signal line extending from a signal source to below or above a first end of the phase shifter and a second signal line extending from below or above a second end of the phase shifter to below the patch antenna, and wherein the first signal line is connected to the first end of the phase shifter by electromagnetic coupling, and the second signal line is connected to the second end of the phase shifter by electromagnetic coupling.

4. The planar antenna according to claim 3, wherein the first signal line is disposed while avoiding a lower region of the patch antenna in plan view.

5. The planar antenna according to claim 2, wherein the single ground layer has a patch slot below the patch antenna, and the signal line and the patch antenna are connected via the patch slot.

6. The planar antenna according to claim 5, wherein the signal line and the patch antenna are connected by electromagnetic coupling via the patch slot.

7. The planar antenna according to claim 5, wherein the signal line and the patch antenna are connected by a power supply line via the patch slot.

8. The planar antenna according to claim 5, wherein the single ground layer is divided into a first ground layer having the patch slot and a second ground layer having the phase shifter slot, and the signal line is disposed between the first ground layer and the second ground layer.

9. An antenna device comprising:

the planar antenna according to claim 1;

a signal source connected to the signal line included in the planar antenna;

a matrix circuit in which a plurality of thin film transistors connected to wiring included in the planar antenna are disposed in a two-dimensional array;

a drive circuit that drives the thin film transistor included in the matrix circuit; and a control circuit that drives the drive circuit in accordance with a control signal.

10. The antenna device according to claim 9, wherein the control circuit causes the plurality of patch antennas included in the planar antenna to transmit a radio wave having directivity from the antenna array configured by the plurality of patch antennas.

* * * * *